United States Patent [19]

Hall

[11] Patent Number: 5,586,033
[45] Date of Patent: Dec. 17, 1996

[54] CONTROL SYSTEM WITH NEURAL NETWORK TRAINED AS GENERAL AND LOCAL MODELS

[75] Inventor: James W. Hall, Bettendorf, Iowa

[73] Assignee: Deere & Company, Moline, Ill.

[21] Appl. No.: 466,957

[22] Filed: Jun. 6, 1995

Related U.S. Application Data

[63] Continuation of Ser. No. 945,293, Sep. 10, 1992, abandoned.

[51] Int. Cl.$^6$ .................................................. G06F 15/18
[52] U.S. Cl. .................... 364/424.07; 364/150; 364/151; 395/23; 395/904; 460/1
[58] Field of Search .................................... 364/149, 150, 364/151, 424.07, 148; 395/22, 904, 23; 460/1, 4, 7

[56] References Cited

U.S. PATENT DOCUMENTS

| | | | |
|---|---|---|---|
| 4,495,577 | 1/1985 | Strunk et al. | 364/424.07 |
| 4,527,241 | 7/1985 | Sheehan et al. | 364/424.07 |
| 4,874,963 | 10/1989 | Alspector | 395/23 X |
| 4,893,241 | 1/1990 | Girodat et al. | 364/424.07 |
| 4,934,985 | 7/1990 | Strubbe | 460/4 |
| 4,967,544 | 11/1990 | Ziegler et al. | 460/1 X |
| 4,967,863 | 11/1990 | Teijido et al. | 180/53.1 |
| 5,034,312 | 7/1991 | Saito | 364/149 X |
| 5,142,612 | 8/1992 | Skeirik | 395/22 X |
| 5,167,009 | 11/1992 | Skeirik | 395/22 X |
| 5,251,144 | 10/1993 | Ramamurthi | 395/904 X |
| 5,253,329 | 10/1993 | Villarreal et al. | 395/23 X |
| 5,268,834 | 12/1993 | Sanner et al. | 364/151 |
| 5,282,261 | 1/1994 | Skeirik | 395/22 |
| 5,305,230 | 4/1994 | Matsumoto et al. | 364/149 X |
| 5,311,421 | 5/1994 | Nomura et al. | 395/22 X |
| 5,319,738 | 6/1994 | Shima et al. | 395/23 X |
| 5,353,207 | 10/1994 | Keeler et al. | 364/148 X |

FOREIGN PATENT DOCUMENTS 2266602  11/1993  United Kingdom .

OTHER PUBLICATIONS

Behnam Bavarian, "Introduction to Neural Networks for Intelligent Control," *IEEE Control Systems Magazine*, Apr. 1988, pp. 3–7.

John Moody et al., "Learning with Localized Receptive Fields," *Proceedings of the 1988 Connectionist Models Summer School*, Dec. 1988, pp. 133–143.

"Neural Networks As An Alternative to PID Controllers", 1990.

"Identification and Control of Dynamic Systems Using Neural Networks", IEEE Transactions on Neural Networks, 1(1):4–27, 1990, Narenda et al.

"Neural Controllers", IEEE International Joint Conference on Neural Networks, 4:551–558, 1988, Psaltis et al.

(List continued on next page.)

Primary Examiner—Collin W. Park

[57] ABSTRACT

A neural network is trained with a general set of data to function as a general model of a machine or process with local condition inputs set equal to zero. The network is then retrained or receives additional training on an extentd data set containing the general set of data, characterized by zero values for the local condition inputs, and data on specific local conditions, characterized by non-zero values for the local condition inputs. The result is a trained neural network which functions as a general model when the inputs for the local conditions inputs are set equal to zero, and which functions as a model of some specific local condition when the local condition inputs match the encoding of the some local data set contained within the training data. The neural network has an architecture and a number of neurons such that its functioning as the local model is partially dependent upon its functioning as the general model. This trained neural network is combined with sensors, actuators, a control and communications computer and with a user interface to function as combine control system.

8 Claims, 28 Drawing Sheets

Microfiche Appendix Included
(4 Microfiche, 300 Pages)

OTHER PUBLICATIONS

The Patent Office of the Japanese Government, Patent Abstracts of Japan, unexamined applications, Kawasaki Steel Corp., P field, vol. 17, No. 29, p. 161 p1472, No. 4-252302, Jan. 20, 1993.

"Artificial Neural Networks Applied to Arc Welding Process Modeling and Control", IEEE Transactions on Industry Applications, 26(5):824–830, 1990.

"Modeling Chemical Process Systems via Neural Computation", IEEE Control System Magazine, Apr. 1990.

"Backpropagation Neural Network for nonlinear Self–Tuning Adaptive Control", IEEE International Syposium of Intelligent Control, 274–279, 1989.

"Adaptation and Learning for Heirarchial Intelligent Control", International Joint Conference on Neural Networks, (IJCNN), 2:1033–1038, Singapore 1991, Fukuda et al.

"A Neomorphic Controller with a Human Teacher", IEEE International Conference on Neural Networks, 2:595–602, 1988.

"A Regulator Design Method Using Multilayered Neural Networks", IEEE Joint Conference on Neural Networks, 3:371–379, 1990, liguni et al.

"Development of a Connectionist Fuzzy Logic System for Control of Gas Metal Arc Welding", Intelligent Engineering Systems Through Artificial Neural Networks, ASME Press, pp. 711–716, 1991, Smartt et al.

"Neural Network Conversion of the Electric Arc Furnace into the Intelligent Arc Furnace", 74th AIME Steelmaking Conference, Washington, D.C., 1991, Staib et al.

"An Adaptive Broom Balancer with Visual Inputs", IEEE International Conference on Neural Networks, 2:641–647, 1988, Tolat et al.

| Fig. 5b | Fig. 5c | Fig. 5d | Fig. 5e |
|---------|---------|---------|---------|
| Fig. 5f | | | |

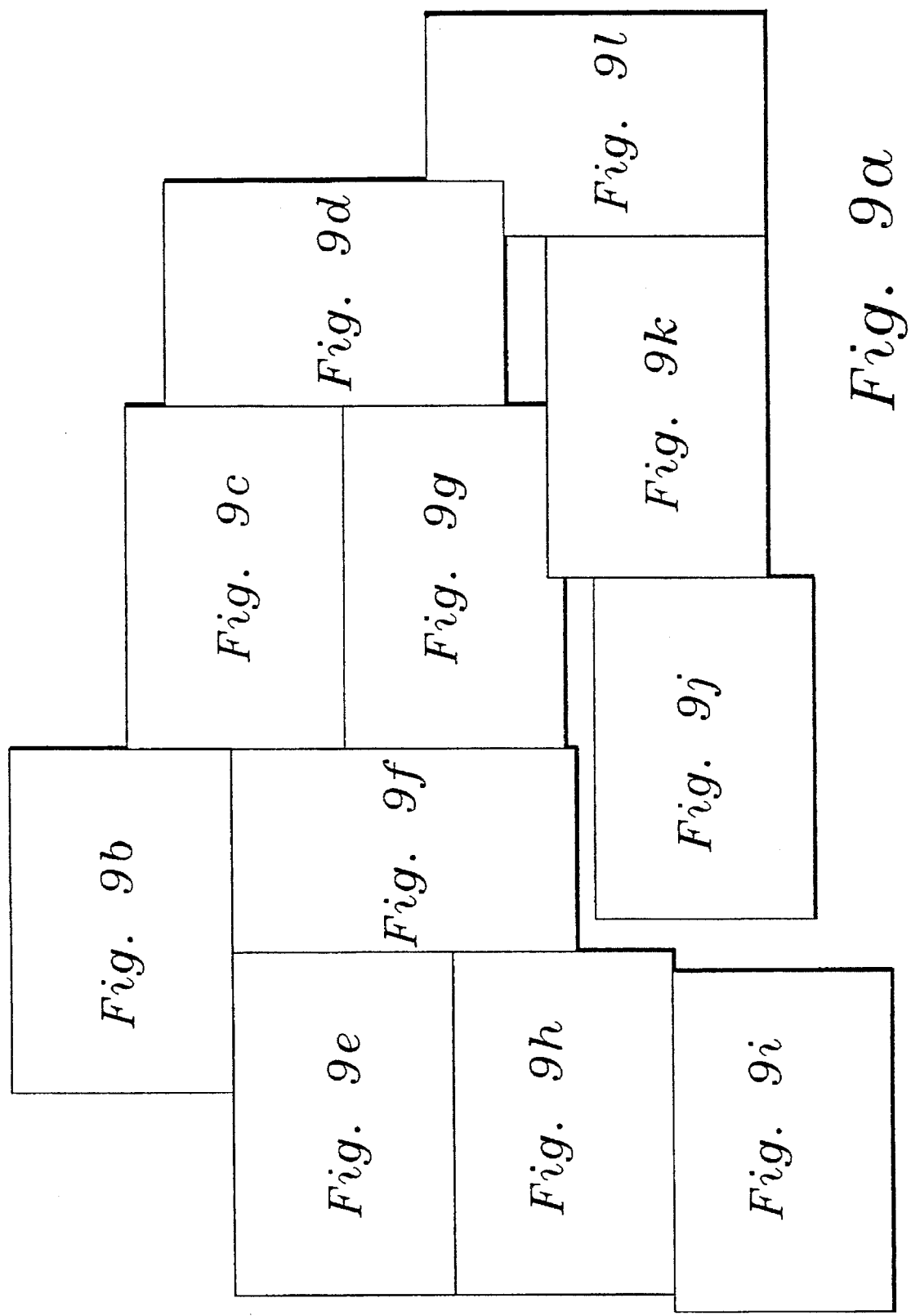

Fig. 10

| SIEVE | 7 | 7 | 7 | 7 | 7 | 7 | 7 | 7 | 7 | 7 | 7 | 7 | 7 | 7 | 7 | 7 | 7 | 7 | 7 |
|---|---|---|---|---|---|---|---|---|---|---|---|---|---|---|---|---|---|---|---|
| CHAFFER | 13 | 13 | 13 | 13 | 13 | 13 | 13 | 13 | 13 | 13 | 13 | 13 | 13 | 13 | 13 | 13 | 13 | 13 | 13 |
| FAN | 1060 | 1060 | 1060 | 1060 | 1060 | 1060 | 1060 | 1060 | 1060 | 1060 | 1060 | 1060 | 1060 | 1060 | 1060 | 1060 | 1060 | 1060 | 1060 |
| CONCAVE | 12 | 4 | 4 | 4 | 4 | 10 | 4 | 4 | 4 | 4 | 4 | 4 | 4 | 4 | 4 | 4 | 4 | 10 | 10 |
| CYL. | 720 | 720 | 720 | 720 | 720 | 820 | 820 | 820 | 720 | 820 | 720 | 820 | 720 | 820 | 820 | 720 | 720 | 820 | 820 |
| FR GRAIN | 5 | 4.92 | 4.34 | 5.15 | 5.99 | 3.14 | 3.73 | 7.88 | 2.85 | 4.48 | 4.4 | 2.96 | 5 | 5.25 | 3.37 | 5.09 | 4.31 | 3.8 | 4.91 |
| REL. HUMID | 14 | 17 | 14 | 14 | 32 | 17 | 26 | 32 | 32 | 17 | 32 | 17 | 14 | 26 | 17 | 14 | 17 | 32 | 32 |
| TIME | 16.5 | 17.6 | 15 | 15.5 | 10.5 | 16.5 | 12.7 | 10.1 | 10.4 | 16.7 | 10.3 | 17 | 16.5 | 13.1 | 17.2 | 15.6 | 17.4 | 16.5 | 10.8 | 10.9 |
| GRAIN h2o | 9.3 | 9.8 | 9.3 | 9.3 | 10.6 | 9.8 | 9.7 | 10.6 | 10.6 | 9.8 | 10.6 | 9.8 | 9.3 | 9.7 | 9.8 | 9.3 | 9.8 | 9.3 | 10.6 | 10.6 |
| MOG h2o | 10 | 10 | 10 | 10 | 10 | 10 | 10 | 10 | 10 | 10 | 10 | 10 | 10 | 10 | 10 | 10 | 10 | 10 | 10 |
| LOCAL 2 | 1 | 1 | 1 | 1 | 1 | 1 | 1 | 1 | 1 | 1 | 1 | 1 | 1 | 1 | 1 | 1 | 1 | 1 | 1 |
| LOCAL 1 | 0 | 0 | 0 | 0 | 0 | 0 | 0 | 0 | 0 | 0 | 0 | 0 | 0 | 0 | 0 | 0 | 0 | 0 | 0 |
| YEILD | 7.5 | 7.5 | 7.5 | 7.5 | 7.5 | 7.5 | 7.5 | 7.5 | 7.5 | 7.5 | 7.5 | 7.5 | 7.5 | 7.5 | 7.5 | 7.5 | 7.5 | 7.5 | 7.5 |
| GROWING | 0 | 0 | 0 | 0 | 0 | 0 | 0 | 0 | 0 | 0 | 0 | 0 | 0 | 0 | 0 | 0 | 0 | 0 | 0 |
| THRESHING | 90 | 90 | 90 | 90 | 90 | 90 | 90 | 90 | 90 | 90 | 90 | 90 | 90 | 90 | 90 | 90 | 90 | 90 | 90 |

Fig. 11

| DOCKAGE | 0 | 0 | 0 | 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|---|---|---|---|
| DAMAGE | 1.8 | NA | 4.5 | NA | NA | NA | NA | NA | NA | NA | NA | NA | 9.4 | NA | NA | NA | 4.3 | NA | NA |
| THRESH LOSS | 0 | 0 | 0 | 0 | 0 | 0 | 0 | 0 | 0 | 0 | 0 | 0 | 0 | 0 | 0 | 0 | 0 | 0 | 0 |
| SEP. LOSS | NA | 24.7 | 0.9 | 9.6 | 32.2 | 0.7 | 1.5 | 43.3 | 0.6 | 3.9 | 6.2 | 0.2 | NA | 23.7 | 0.1 | NA | 1.4 | NA | 0.7 | 6.8 |
| CLEANER LOSS | NA | NA | NA | NA | NA | NA | NA | NA | NA | NA | NA | NA | NA | NA | NA | 1.43 | NA | NA | NA | NA |

CONTROL SYSTEM WITH NEURAL NETWORK TRAINED AS GENERAL AND LOCAL MODELS

This application is a Continuation of application Ser. No. 07/945,293, filed 10 Sep. 1992, now abandoned.

BACKGROUND OF THE INVENTION

This application includes a microfiche appendix including four microfiche and 300 frames.

The invention relates to a control system which utilizes a neural network, and more particularly, to such a control system for a combine harvester.

Combine grain harvesters are complex machines and carry out a complex process that currently requires human supervisory control. The many adjustments built into a combine harvester provide versatility, but also make set-up and operation of the machine very difficult, even for experienced operators. For nearly 30 years, researchers have attempted to control sub-systems of the harvesting process with traditional forms of automatic controls. Examples include automatic feedrate controls, threshing cylinder speed with controls and cleaning fan controls. More recently, attempts have been made to model or control the harvesting process rule-based expert systems however, none of these proposed solutions have proven successful in the marketplace. One reason for this lack of success is that interactions exist between sub-systems. Effective optimization requires consideration of the entire machine or process rather than isolated sub-systems.

SUMMARY OF THE INVENTION

Accordingly, an object of this invention is to provide a neural network based control system for a combine harvester.

A further object of the invention is to provide such a control system which can respond to and control the entire machine rather than only portions or sub-systems of the machine.

A further object of the invention is to provide such a control system which can function in response to a general or typical set of conditions and which can function in response to different specific local conditions.

Another object of the invention is to provide such a control system which can function in response to different specific local conditions while retaining the ability to function in response the general or typical set of conditions.

These and other objects are achieved by the present invention, which includes a neural network with an architecture including a plurality of neurons, including hidden layers. Each of the neurons in one of the layers has a plurality of inputs. At least one of these inputs is a local condition input which is set equal to zero while the network is trained with a general set of data. The network is then re-trained or receives additional training on an extended data set containing the general set of data, characterized by zero values for the local condition inputs, and data on specific local conditions, characterized by non-zero values for the local condition inputs. The resulting trained network will function as a general model and as a local model and the local model will function partially dependent upon the general model. This trained neural network is combined with sensors, actuators, a control and communications computer and with a user interface to function as a combine control system.

BRIEF DESCRIPTION OF THE DRAWINGS

FIG. 5a shows the arrangement of FIGS. 5b–5f.

FIG. 9a shows the arrangement of FIGS. 9b–9l.

FIGS. 10 and 11 illustrate in tabular form experimentally determined data for a local condition.

DETAILED DESCRIPTION

Figure 1:
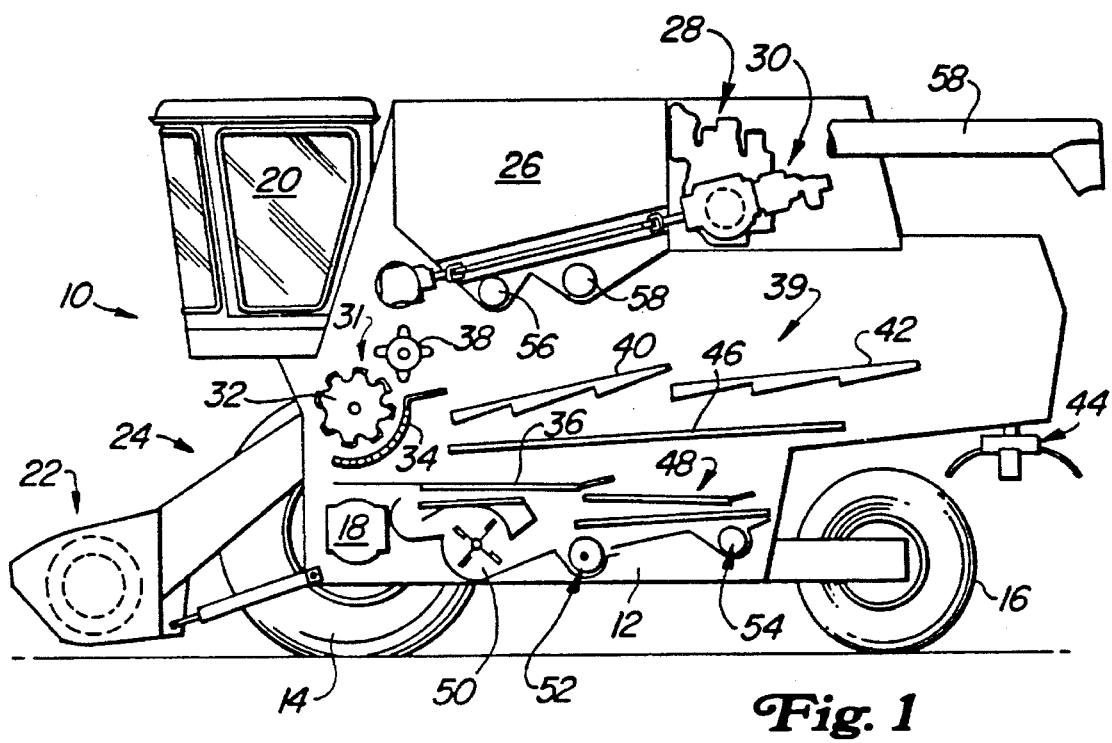
FIG. 1 is a side view of a combine schematically illustrating its major systems and components.

FIG. 1 illustrates an agricultural combine 10, such as a John Deere Model 9500 production combine harvester, such as described in U.S. Pat. No. 4,967,863, issued 6 Nov. 1990 to Teijido et al., and assigned to the assignee of the present invention. The combine 10 has a chassis 12 and ground engaging wheels 14 and 16. Forward ground engaging wheels 14 are driven by hydraulic motor 18 located between the wheels. Harvesting platform 22 extends forwardly from the chassis of the combine and is used for harvesting a crop in a field. After harvesting, the crop is then directed through feeder house 24 and into the combine. Clean grain compartment 26 is located behind the operator's cab 20 at the top of the combine. Behind compartment 26 is transverse internal combustion engine 28 which is the prime mover of the combine, powering the propulsion means, the harvesting means, and the threshing and separating means. The internal combustion engine 28 is provided with a driving means 30 for powering the various usage assemblies.

Between the sides of the combine, which form the chassis of the combine, is located the threshing and separating means. The threshing and separating means separates the grain from the straw and chaff of the harvested crop. The feeder house directs the harvested grain to threshing means 31 which comprises rotating transverse threshing cylinder 32, transverse concave 34, and rotating beater 38. As the crop passes between cylinder 32 and concave 34, grain and chaff fall through the concave to pan 36 and the remaining straw and unseparated grain is advanced to beater 38.

After threshing, the straw in the crop is advanced to separating means 39. The main elements of the separating means are straw walkers 40 and 42, and cleaning shoe assembly 48. From beater 38 the crop is advanced to the oscillating straw walkers 40 and 42 which direct the straw to the rear of the combine where it is returned to the field by straw spreader 44. Grain and chaff falling through the straw walkers falls onto oscillating slanted pan 46 which directs the grain and chaff to pan 36. The grain and chaff are directed from pan 36 by overhead auger assemblies to cleaning shoe assembly 48 which is used to separate the chaff from the grain. The grain and chaff falling onto the chaffer 47, sieve 49 and chaffer extension 51 of the cleaning shoe assembly encounters an air stream from fan 50 which blows the lighter chaff out of the rear of the combine while the heavier grain falls through the cleaning shoe assembly and into clean grain receiving auger 52.

Auger 52 directs the clean grain to a clean grain elevator (not shown) which in turn directs the grain to clean grain compartment 26. Tailings, that is unthreshed heads of grain, fall into tailings auger 54 which directs the unthreshed heads back to the threshing cylinder and concave. When the clean grain compartment is to be unloaded, transverse unloading augers 56 and 58 direct the grain to the side of the compartment from where it comes into contact with a vertical unloading auger (not shown) which directs the clean grain through unloading tube 58. During an unloading operation, tube 58 would normally be extended outwardly from the side of the combine so that clean grain can be more readily directed into a wagon or truck. It should be noted that the arrangement of the threshing and separating elements is well known, and that this invention is directed to a control system for controlling the operation of these elements and the combine.

The cleaner assembly 48 of the combine 10 is equipped with three sieving surfaces. The upper surface, or chaffer 47, is adjusted to retain the large pieces of material other than grain, "MOG", while allowing the grain and small pieces of chaff to pass through. The sieve 49 is located under the chaffer 47. The sieve 49 is adjusted to remove the small pieces of chaff, while allowing the cleaned grain to pass through. At the rear of the cleaner assembly is the chaffer-extension 51. Its purpose is to scavenge any remaining grain or unthreshed heads of grain before the trash is discharged from the combine 10. Each of these sieving surfaces is composed of adjustable louvers (not shown). A combination of louver opening and fan speed is used to completely clean the grain with a minimum of grain loss. In the production model of the combine, the operator must leave the cab, and make these louver adjustments from the ground at the rear of the machine.

Figure 2:
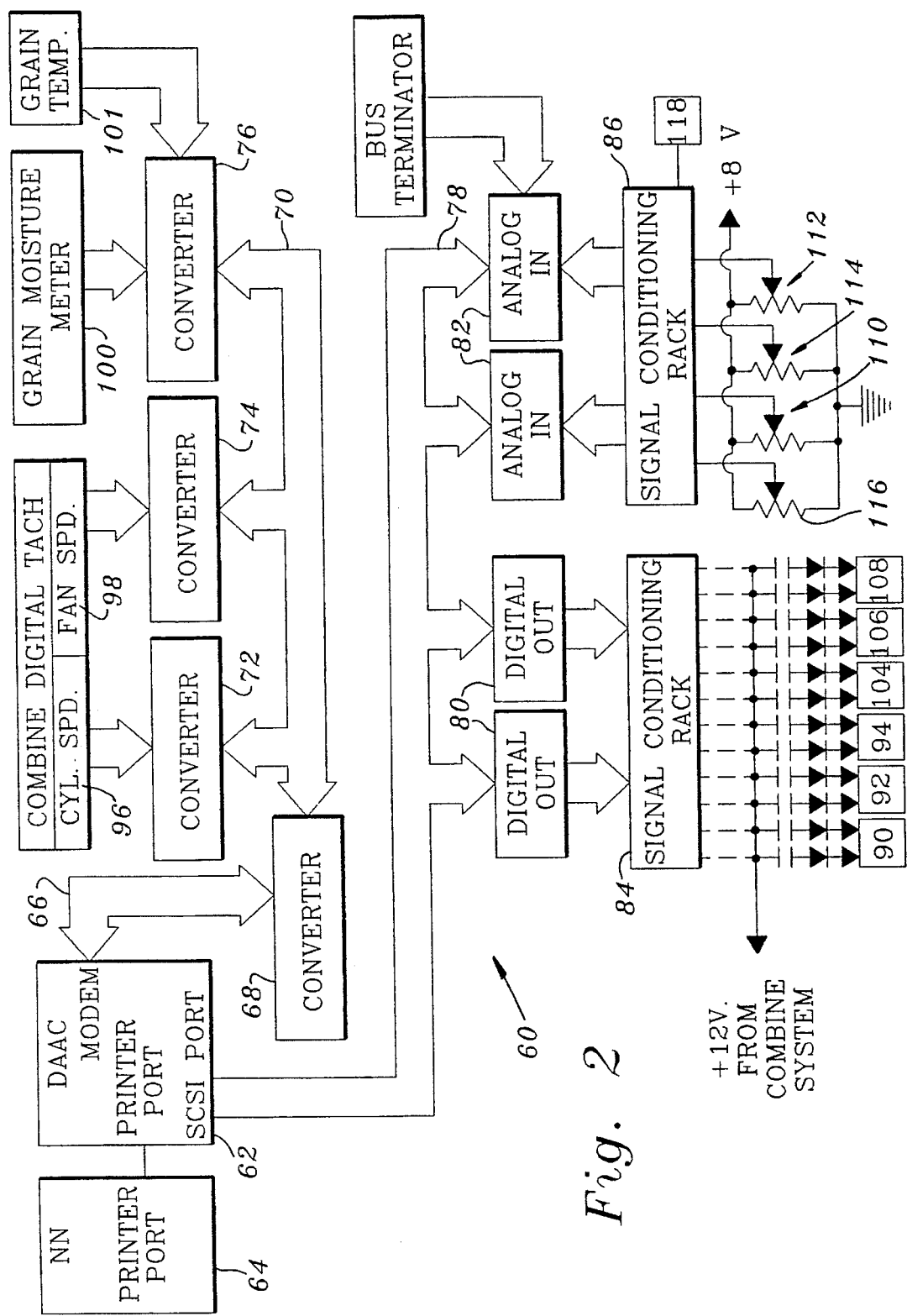
FIG. 2 is schematic block diagram of the control system of the present invention.

Referring now to FIG. 2, the control system 60 includes a variety of sensors and actuators, a data acquisition system, a data acquisition/actuator control computer (DAAC) 62 to control the actuators, and a second or neural network emulator computer (NN) 64 to run the neural network process model.

The data acquisition/control computer 62 functions as a closed loop controller for the adjustment actuators, gathers and processes sensor data, and feeds data to and from the neural network computer 64. The computer 62 is preferably an Apple Macintosh portable computer with 8 MB of RAM and a 40 MB hard disk, is relatively small, includes a flat LCD screen, is battery-powered, and is preferably mounted in the harvester cab. The second computer 64 functions as a neural network processor or emulator, and is preferably a Macintosh portable or laptop computer, also located in the cab of the combine 10. Computers 62 and 64 are connected to each other via their printer ports.

Computer 62 includes an internal modem (not shown) which is connected by an RS-422 data bus 66 to an RS-485-to-RS-422 converter 68 (preferably model number M1200), which is in turn connected to an RS-485 data bus 70. Bus 70 is in turn connected to a pair of frequency-to-RS-485 converters 72 and 74 (preferably model number M1602) and to an RS-232-to-RS-485 converter 76 (model 485COR from B & B Electronics Mfg. Ottawa, Ill.). Converters 68, 72 and 74 are commercially available from the Keithly Metrabyte Company, Taunton, Mass.

A SCSI port of computer 62 is connected to SCSI bus 78. Bus 78 is connected to a pair of 8-channel MacADIOS digital output devices 80 and to a pair of 8-channel MacADIOS analog input devices 82. Devices 80 are connected to a rack 84 of output signal conditioning circuits for 16 digital output relays. Devices 82 are connected to a rack 86 of input signal conditioning circuits for 16 analog input channels. The SCSI digital output devices 80 are preferably model GWI-8DIO, and the SCSI analog input devices 82 are preferably model GWI-8AIN, both from GW Instruments, Somerville, Mass. The digital output signal condition modules 84 are preferably model ODC-05, and the analog input conditioning modules 86 are preferably model MB-31-03, all from Keithly Metrabyte, Taunton, Mass. Power is supplied by a 12 VDC/110 VAC inverter.

A threshing cylinder speed adjusting actuator 90 is connected to module 84 via a speed increase relay and a speed decrease relay. A cleaning fan speed adjusting actuator 92 is connected to module 84 via a fan speed increase relay and a fan speed decrease relay. A concave clearance adjusting actuator 94 is connected to module 84 via a clearance increase relay and a clearance decrease relay. Electro-hydraulic or electric actuators 90, 92 and 94 are already available on the production model John Deere 9500 Combine. In the production combine these actuators are controlled through rocker-switches mounted on an operator's console. Computer control of these actuators is implemented by paralleling electrical relay modules with the contacts of the rocker switches. Thus, the actuators 90–94 may be operated manually, or they could be controlled by the computer through a digital output signal to the relays. As a safety precaution, the relays are wired in such a way that manual inputs take priority over computer inputs.

The production model harvester comes already equipped with digital tachometers 96 and 98 which provide feedback signals representing the speed of threshing cylinder 32 and the speed of the cleaner fan 50. The speed signals coming into these tachometers were frequency pulses from Hall-effect sensors (not shown) located on the rotating shafts (not shown). To transform these raw signals into a form that could be read by the data acquisition/control computer 72, they are fed first into the frequency-to-RS-485 converters 72 and 74 and subsequently through bus 70, converter 68 and bus 66 to the modem port of the computer 62.

The system also includes a grain moisture sensor 100 such as a "MoistureTrac" model 5010 manufactured by Shivvers Inc., Corydon, Iowa, with an RS-232 communications port installed by the manufacturer, and a grain temperature sensor 101. The grain moisture and grain temperature readings pass through converter 76, bus 70, then through converter 68 and bus 66 to the computer 62. Sensors 100 and 101 are preferably located in the clean grain compartment 26 of the combine 10.

An ambient relative humidity sensor 118 (such as a model CT-827-D-X21 sensor from Hy-Cal Corporation, El Monte, Calif.) provides an analog signal which is applied directly to one of the Analog/Digital input channels of the rack 86.

Time-of-day signals are obtained from the internal clock (not shown) of the data acquisition computer 62.

The control system of the present invention includes a chaffer adjusting actuator 104, a cleaner extension adjusting actuator 106 and a sieve adjusting actuator 108. Like actuators 90–94, each of actuators 104–108 is connected to module 84 by a corresponding pair of relays. Preferably, these actuators are ball-screw electric actuators, such as Warner Electric ElecTrak model S24-17A8-02, and are mounted on the stationary frame (not shown) of the harvester, and connected to the corresponding production adjustment linkage through flexible cables (not shown). The shaking motion of the cleaner assembly 48 is absorbed in the flexible cables, thus extending the life of the actuators 104–108.

Because of hysteresis due to wind-up in the cables and tolerance stack-up from the adjustment linkage joints, it is not possible to accurately control the louver position by monitoring the position of the actuators. To solve this problem, three accurate rotary potentiometers 110, 112 and 114 are preferably mounted directly on the rear-most louver shafts (not shown) of the louvers (not shown), one each for the chaffer 47, the sieve 49, and the cleaner extension 51 and provide corresponding louver position feedback signals. Because of the severe vibration and dust, a sealed and contactless sensor is preferred, such as model CP-2UK-R potentiometers commercially available from Midori.

An oil-filled linear potentiometer 116, such as model L010-100 from ETI, Oceanside, Calif., is used to provide a position feedback signal representing the clearance between the threshing cylinder 32 and the concave 34. Such an oil-filled version is reliable in a very dusty environment.

A feedrate sensor 118 is installed near the top of the clean grain elevator (not shown) of the combine 10 to measure the grain feedrate. This sensor may be an infrared or photoelectric sensor such as described in GB Patent Specification 1,506,329, published 5 Apr. 1978 or a weight sensitive flow meter such as described in U.S. Pat. No. 4,765,190, issued 23 Aug. 1988. The analog output of the sensor 118 is fed into one of the A/D input channels of module 86. For further information relating to the arrangement of the electrical relay modules, rocker switches, sensors and actuators, reference is hereby made to FIGS. 9a–9l and the following part list.

PART LIST

| PART | PART TYPE | PART FUNCTION |
|---|---|---|
| | | PANEL 1 |
| C1 | 10MFD CAPACITOR | VR1 OUTPUT LINE NOISE SUPPRESSOR |
| C2 | .33MFD CAPACITOR | VR1 AND VR2 INPUT LINE NOISE SUPPRESSOR |
| D1 | 1N4001 DIODE | K1 TRANSIENT SUPPRESSION DIODE |
| D2 | 1N4001 DIODE | K2 TRANSIENT SUPPRESSION DIODE |
| D3 | 1N4001 DIODE | K3 TRANSIENT SUPPRESSION DIODE |
| D4 | 1N4001 DIODE | K4 TRANSIENT SUPPRESSION DIODE |
| D5 | 1N4001 DIODE | K5 TRANSIENT SUPPRESSION DIODE |
| D6 | 1N4001 DIODE | K6 TRANSIENT SUPPRESSION DIODE |
| D7 | 1N4001 DIODE | CHAFFER OPEN COMMAND LINE ISOLATION DIODE |
| D8 | 1N4001 DIODE | CHAFFER CLOSE COMMAND LINE ISOLATION DIODE |
| D9 | 1N4001 DIODE | EXTENSION OPEN COMMAND LINE ISOLATION DIODE |
| D10 | 1N4001 DIODE | EXTENSION CLOSE COMMAND LIKE ISOLATION DIODE |
| D11 | 1N4001 DIODE | SIEVE OPEN COMMAND LINE ISOLATION DIODE |
| D12 | 1N4001 DIODE | SIEVE CLOSE COMMAND LINE ISOLATION DIODE |
| D13 | 1N4001 DIODE | INCREASE FAN SPEED COMMAND LINE ISOLATION DIODE |
| D14 | 1N4001 DIODE | DECREASE FAN SPEED COMMAND LINE ISOLATION DIODE |
| D15 | 1N4001 DIODE | INCREASE CYLINDER SPEED COMMAND LINE ISOLATION DIODE |
| D16 | 1N4001 DIODE | DECREASE CYLINDER SPEED COMMAND LINE ISOLATION DIODE |
| D17 | 1N4001 DIODE | INCREASE CONCAVE CLEARANCE COMMAND LINE ISOLATION DIODE |
| D18 | 1N4001 DIODE | DECREASE CONCAVE CLEARANCE COMMAND LINE ISOLATION DIODE |
| D19 | 1N4001 DIODE | K8 TRANSIENT SUPPRESSION DIODE |
| D20 | 1N4001 DIODE | K9 TRANSIENT SUPPRESSION DIODE |
| F1 | 10 AMP FUSE | ARMREST EXTENSION PANEL 12 VOLT PROTECTION FUSE |
| J1 | 37 PIN AMP SERIES 1 CONNECTOR | CONNECTS ARMREST EXTENSION TO I/O HARDWARE RACK |
| J2 | 16 PIN AMP SERIES 1 CONNECTOR | CONNECTS ARMREST EXTENSION TO SENSOR ASSEMBLIES |
| J3 | 14 PIN AMP SERIES 1 CONNECTOR | CONNECTS ARMREST EXTENSION TO PRODUCTION ARMREST |
| J4 | 4 PIN AMP SERIES 1 CONNECTOR | SUPPLY POWER TO MOISTURE TRAC MODEL 5010 |
| K1 | P & B VFM SERIES RELAY | CHAFFER OPEN RELAY |
| K2 | P & B VFM SERIES RELAY | CHAFFER CLOSE RELAY |
| K3 | P & B VFM SERIES RELAY | EXTENSION OPEN RELAY |
| K4 | P & B VFM SERIES RELAY | EXTENSION CLOSE RELAY |
| K5 | P & B VFM SERIES RELAY | SIEVE OPEN RELAY |
| K6 | P & B VFM SERIES RELAY | SIEVE CLOSE RELAY |
| K7 | HI G CAW SERIES RELAY | FAN SPEED COMMAND PRIORITY RELAY |

-continued

PART LIST

| PART | PART TYPE | PART FUNCTION |
|---|---|---|
| K8 | P & B VFM SERIES RELAY | CYLINDER SPEED INCREASE RELAY |
| K9 | P & B VFM SERIES RELAY | CYLINDER SPEED DECREASE RELAY |
| M1 | ACCULEX DIGITAL PANEL METER | DISPLAY CHAFFER POSITION |
| M2 | ACCULEX DIGITAL PANEL METER | DISPLAY EXTENSION POSITION |
| M3 | ACCULEX DIGITAL PANEL METER | DISPLAY SIEVE POSITION |
| R1 | 470 OHM RESISTOR | ISOLATION RESISTOR |
| R2 | 470 OHM RESISTOR | ISOLATION RESISTOR |
| R3 | 470 OHM RESISTOR | ISOLATION RESISTOR |
| RV1 | POTENTIOMETER | CHAFFER DPM SPAN |
| RV2 | POTENTIOMETER | EXTENSION DPM ZERO |
| RV3 | POTENTIOMETER | SIEVE DPM ZERO |
| SW1 | JD AH109120 ROCKER SWITCH | CHAFFER OPEN/CLOSE SWITCH |
| SW2 | JD AH109120 ROCKER SWITCH | EXTENSION OPEN/CLOSE SWITCH |
| SW3 | JD AH109120 ROCKER SWITCH | SIEVE OPEN/CLOSE SWITCH |
| VR1 | 78M05 VOLTAGE REGULATOR | SUPPLY 5 V POWER TO DIGITAL PANEL METERS |
| VR2 | 78M08 VOLTAGE REGULATOR | SUPPLY 8 V EXCITATION TO FEED BACK POTENTIOMETERS |
| | | PANEL 2 |
| D1 | PRODUCTION PART | VR1 TRANSIENT SUPPRESSOR |
| D3 | PRODUCTION PART | K1 TRANSIENT SUPPRESSOR |
| K1 | PRODUCTION PART | HEADER CLUTCH INTERRUPT |
| J1 | PRODUCTION PART | CONNECTS TO VARIOUS OTHER COMBINE COMPONENTS |
| J2 | PRODUCTION PART | CONNECTS TO VARIOUS OTHER COMBINE COMPONENTS |
| J3 | PRODUCTION PART | CONNECTS SW9 TO PC BOARD |
| SW1 | PRODUCTION PART | HEADER ENGAGE ON/OFF |
| SW2 | PRODUCTION PART | SEPARATOR ENGAGE ON/OFF |
| SW3 | PRODUCTION PART | REEL SPEED INCREASE/DECREASE |
| SW4 | PRODUCTION PART | REEL POSITION FORE/AFT |
| SW5 | PRODUCTION PART | PARKING BRAKE ON/OFF |
| SW7 | PRODUCTION PART | CYLINDER SPEED INCREASE/DECREASE (FUNCTION PARALLELED) |
| SW8 | PRODUCTION PART | CONCAVE POSITION INCREASE/DECREASE (FUNCTION PARALLELED) |
| SW9 | PRODUCTION PART | AUGER ENGAGE ON/OFF |
| SW10 | PRODUCTION PART | AUGER SWING |
| SW12 | PRODUCTION PART | ENGINE SPEED SELECT HI/LO |
| SW14 | PRODUCTION PART | 4WD SELECT ON/OFF |
| SW15 | PRODUCTION PART | FAN SPEED INCREASE/DECREASE (FUNCTION PARALLELED) |
| TIME DELAY COMPONENTS | PRODUCTION PARTS | SEAT SWITCH/HEADER ENGAGE TIMER |
| VR1 | PRODUCTION PARTS | 5 VOLT REGULATOR |
| | | CHAFFER ACTUATOR ASSEMBLY |
| CHAFFER ASSEMBLY | MODIFIED PRODUCTION PART | |
| J5 | 6 PIN WEATHER PAK SERIES | INTERCONNECTS SIGNALS AND EXCITATION TO CHAFFER, EXTENSION, AND SIEVE ASSEMBLIES |
| J6 | 2 PIN WEATHER PAK SERIES | SUPPLIES 12 VOLTS TO CHAFFER POSITION MOTOR |
| MOTOR | WARNER S2417A8-02 | POSITIONS CHAFFER |
| PUSH/PULL CABLE | | CONNECTS MOTOR TO CHAFFER ASSEMBLY |
| FEEDBACKSENSOR | MIDORI CP2US | REPORTS CHAFFER POSITION |
| | | EXTENSION ACTUATOR ASSEMBLY |
| EXTENSION ASSEMBLY | MODIFIED PRODUCTION PART | |
| J7 | 3 PIN WEATHER PAK SERIES | INTERCONNECTS SIGNALS AND EXCITATION TO CHAFFER, EXTENSION, AND SIEVE ASSEMBLIES |
| J8 | 2 PIN WEATHER PAK SERIES | SUPPLIES 12 VOLTS TO EXTENSION POSITION MOTOR |
| MOTOR | WARNER S2417A8-02 | POSITIONS EXTENSION |
| PUSH/PULL CABLE | | CONNECTS MOTOR TO EXTENSION ASSEMBLY |
| FEEDBACK SENSOR | MIDORI CP2US | REPORTS EXTENSION POSITION |
| | | SIEVE ACTUATOR ASSEMBLY |
| SIEVE ASSEMBLY | MODIFIED PRODUCTION PART | |
| J5 | 6 PIN WEATHER PAK SERIES | INTERCONNECTS SIGNALS AND EXCITATION TO CHAFFER, EXTENSION, AND SIEVE ASSEMBLIES |

PART LIST

| PART | PART TYPE | PART FUNCTION |
| --- | --- | --- |
| J9 | 2 PIN WEATHER PAK SERIES | SUPPLIES 12 VOLTS TO SIEVE POSITION MOTOR |
| MOTOR | WARNER S2417A8-02 | POSITIONS SIEVE |
| PUSH/PULL CABLE | | CONNECTS MOTOR TO SIEVE ASSEMBLY |
| FEEDBACK SENSOR | MIDORI CP2US | REPORTS SIEVE POSITION |
| CONCAVE POSITION ACTUATOR ASSEMBLY | | |
| POT | LINEAR ACTION POTENTIOMETER | REPORT CONCAVE POSITION |
| RS 485 BUS INTERFACE MODULES | | |
| M1602 (C) | KEATHLEY M1602 | CONVERTS PRODUCTION CYLINDER SPEED SIGNAL TO AN RS 485 OUTPUT |
| M1602 (F) | KEATHLEY M1602 | CONVERTS PRODUCTION FAN SPEED SIGNAL TO AN RS 485 OUTPUT |
| 485COR | B & B ELECTRONICS | CONVERTS RS 232 SIGNAL FROM MOISTURE TRAC TO RS 485 OUTPUT |
| GRAIN MOISTURE SAMPLING SYSTEM | | |
| MODEL 5010 | SHIVVERS MOISTURE TRAC | SAMPLES GRAIN ENTERING GRAIN TANK AND REPORTS MOISTURE CONTENT |
| 110 VOLT AC VOLTAGE SOURCE | | |
| 110VAC INVERTER | | SUPPLIES 110VAC TO SYSTEM |

Other parts and circuits shown on FIGS. 9b–9l are production combine parts and are shown for purposes of clarity.

Figure 3:
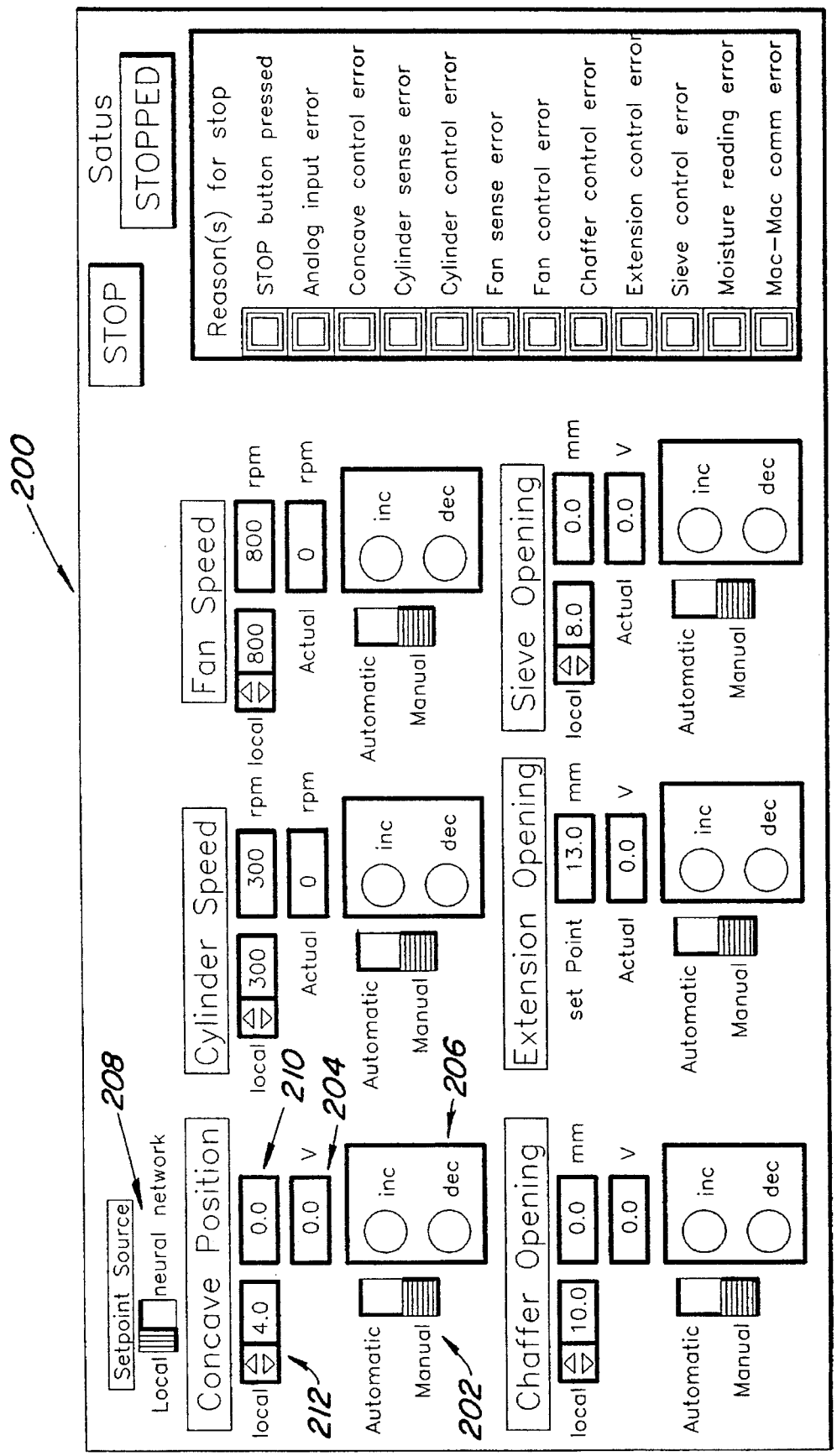
FIG. 3 illustrates the graphical user interface implemented by the data acquisition/actuator control (DAAC) computer of FIG. 2.

Referring now to FIG. 3, a graphical user interface (GUI) 200 is implemented by the data acquisition/actuator control (DAAC) computer 62. GUI 200 includes switches, digital input and output devices and indicator lights relating to concave position, cylinder speed, fan speed, chaffer opening, extension opening and sieve opening. For each of these combine functions the GUI 200 includes an auto/manual switch 202 so that the operator can select manual control of the associated actuator or automatic, closed loop control of the associated actuator. A readout 204 displays the actual value from the sensor associated with the combine function. Status lights 206 indicate whether the associated combine function is increasing or decreasing. A setpoint select switch 208 can be set to a local position wherein the setpoints are determined manually by the operator via front panel settings and to a neural network position wherein the setpoints are determined by the neural network regardless of the front panel settings.

A setpoint readout 210 displays the value of the setpoints determined by the neural network. A setpoint readout 212 displays the value of the operator determined setpoint associated with the combine function. Also included is a kill or stop button, a stopped or running status indicator and a set of error indicators.

The computer 62 functions as the GUI 200, and functions with respect to data acquisition, receiving sensor data and with respect to closed loop control of the adjustment actuators. The computer 62 is programmed to perform these functions using commercially available LabView II computer software from National Instruments. Programming in this language is very similar to constructing an analog wiring diagram. The various graphical elements of this language are selected from the LabView menus and incorporated into the GUI 200. With this software it is possible to program the computer 62, complete with GUI 200, without an extensive amount of custom programming.

For more detailed information concerning the program which causes the computer 62 to perform as desired, reference is made to the appropriate portions of the graphical computer program listing included in the microfiche appendix. This graphical computer program listing is in the LabView II graphical language.

Figure 4A:
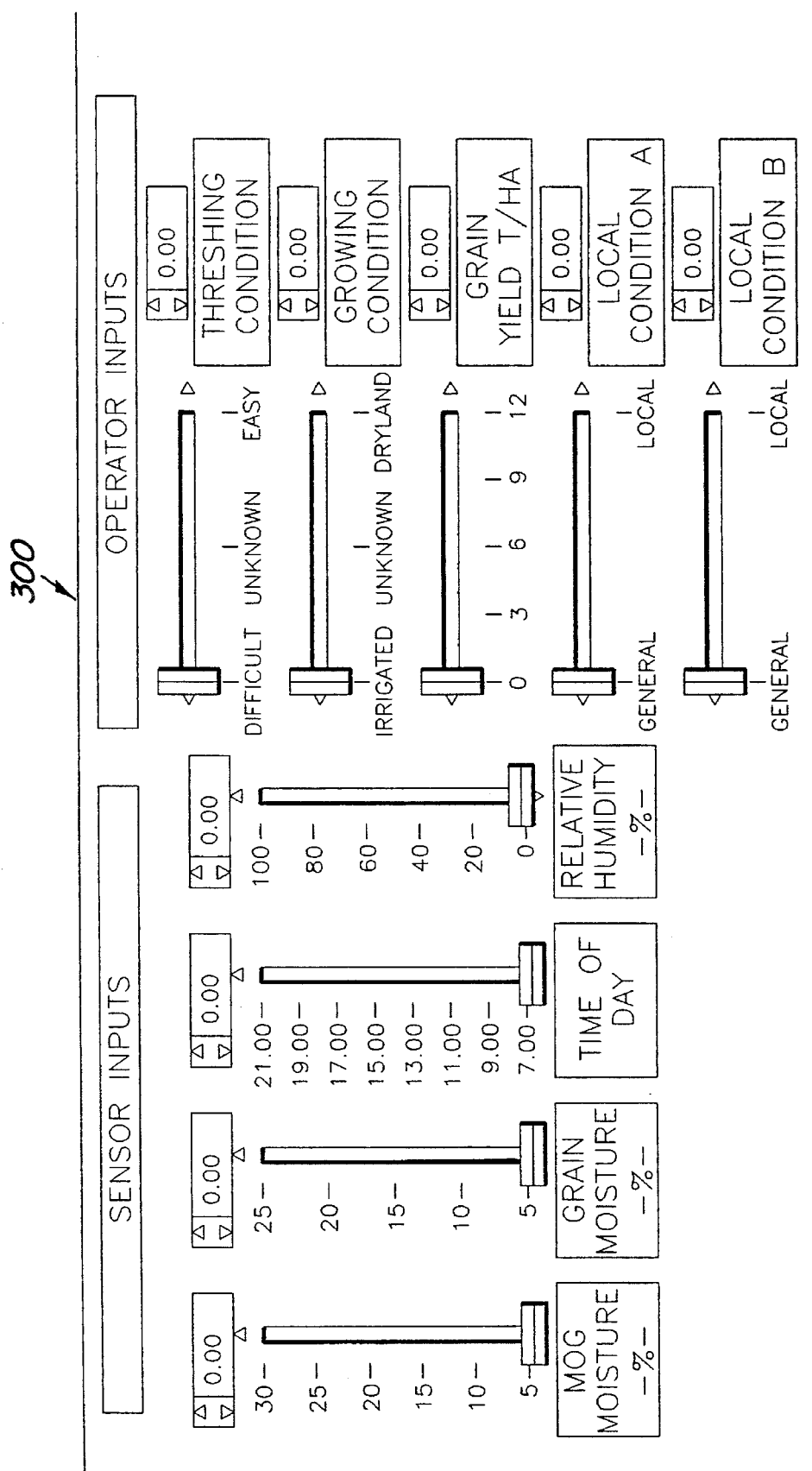
FIGS. 4a–4c illustrate the graphical user interfaces implemented by the neural network emulation computer of FIG. 2.
Figure 4B:
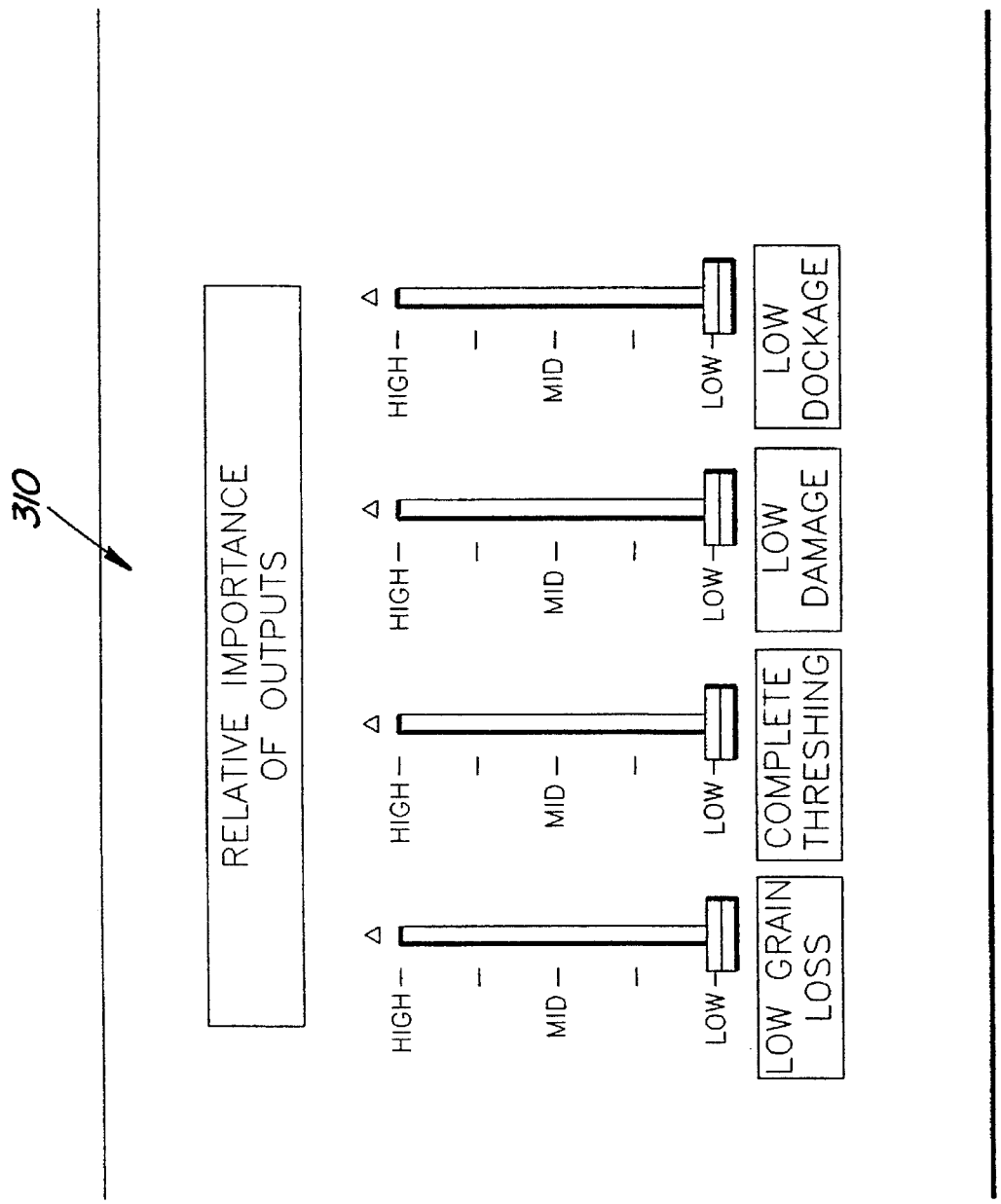
Figure 4C:
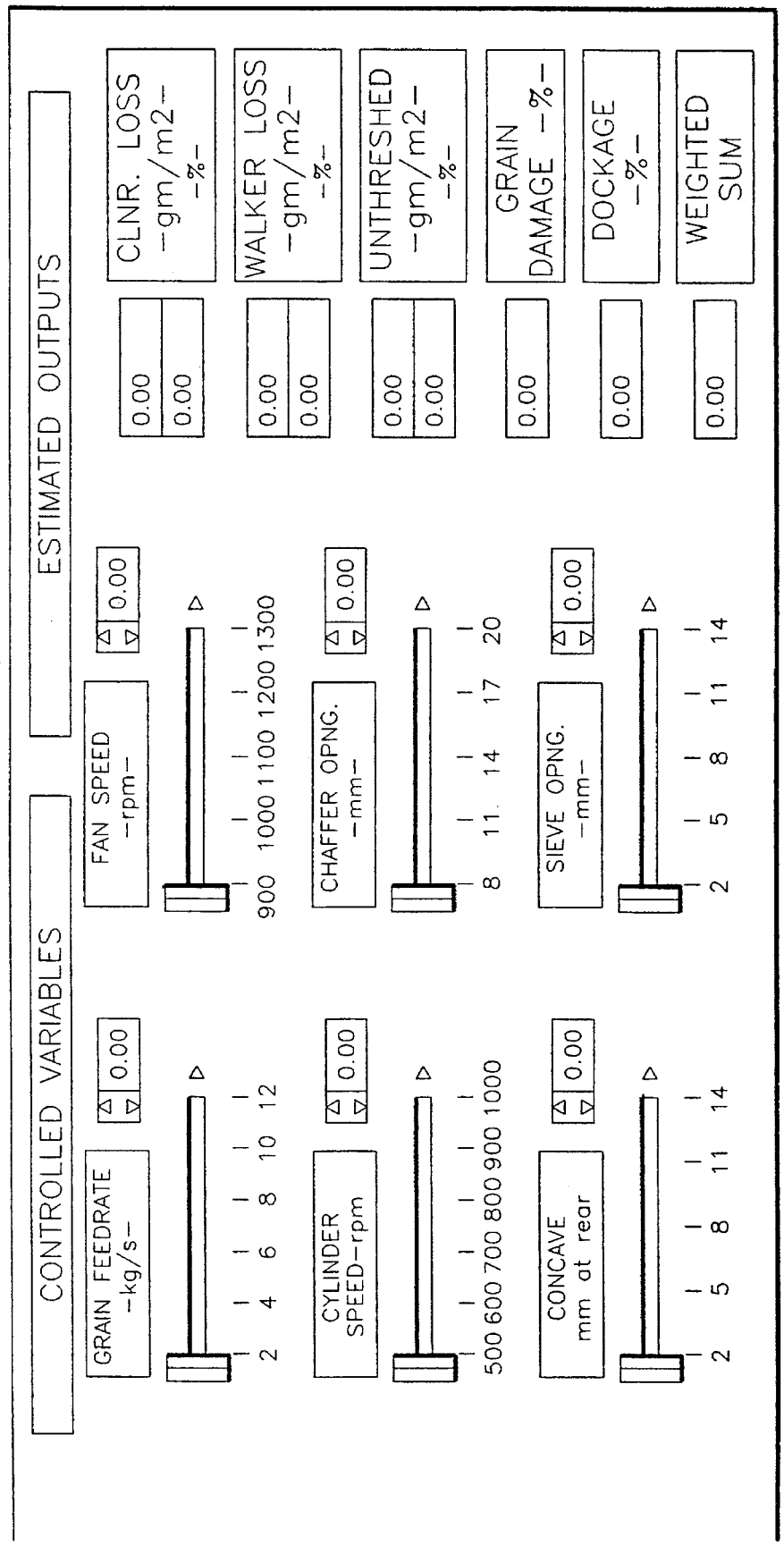
Figure 5B:
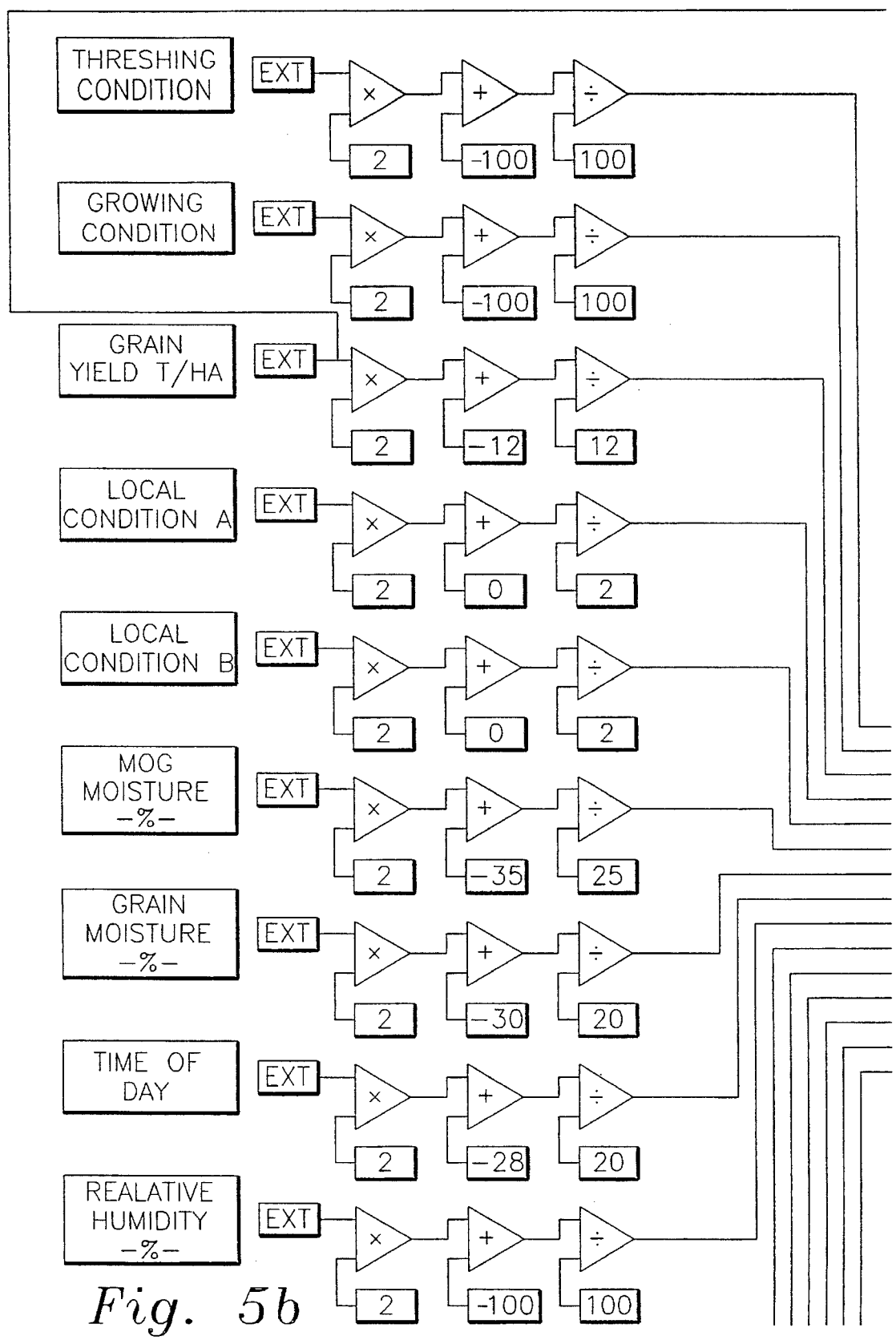
FIGS. 5b–5f are combined to form a top level schematic diagram illustrating neural network emulator of FIG. 2.
Figure 5C:
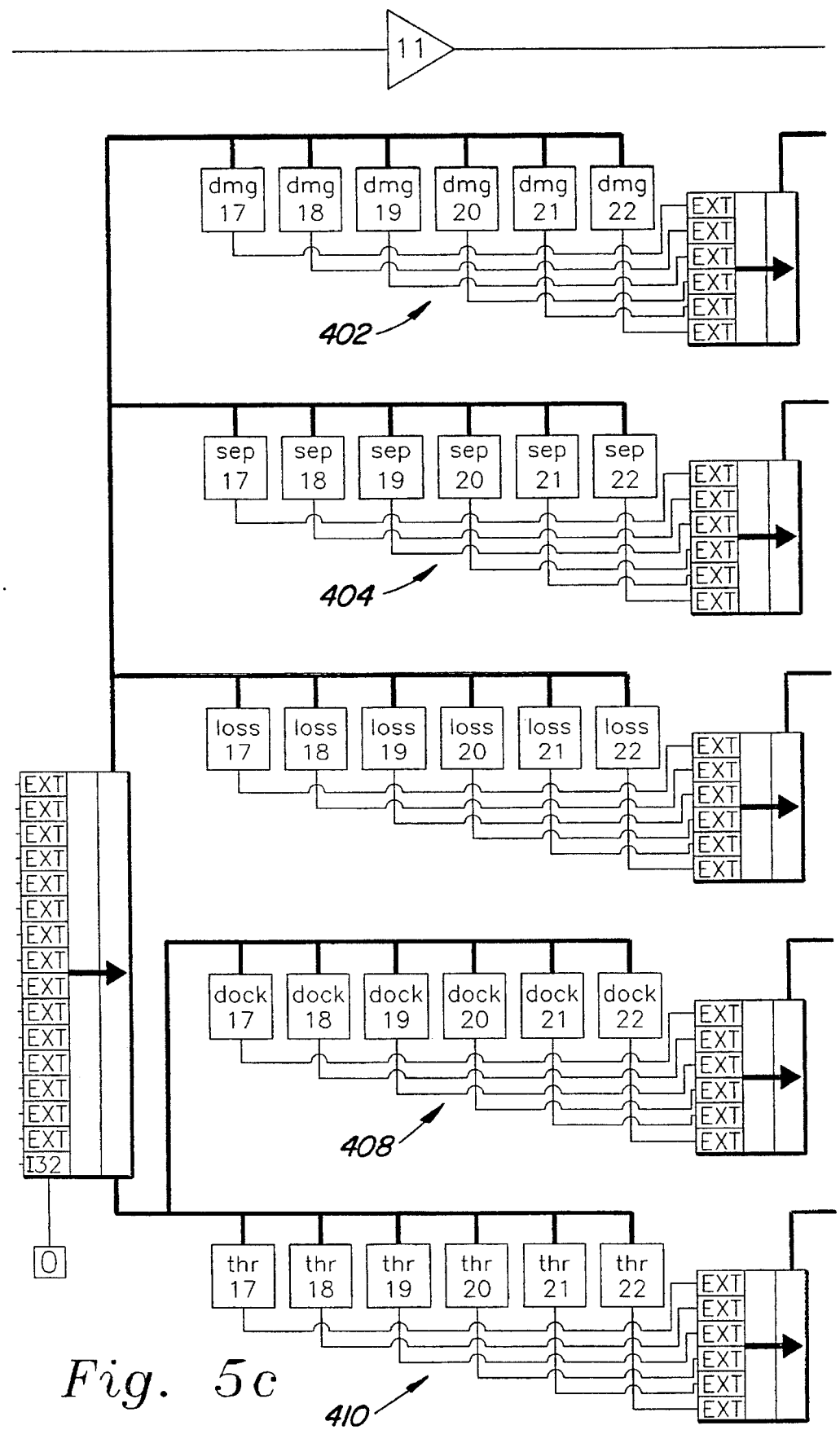
Figure 5D:
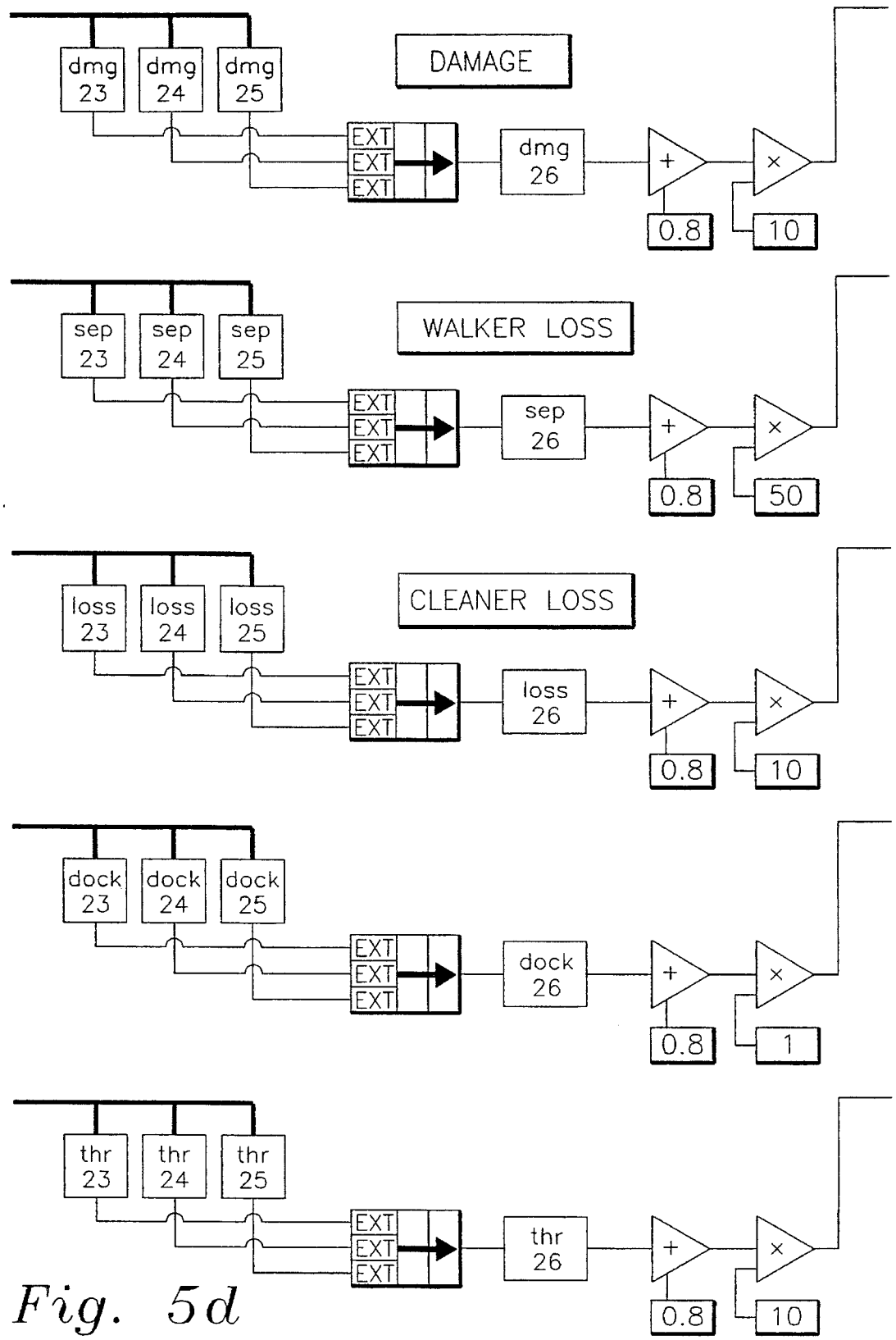
Figure 5E:
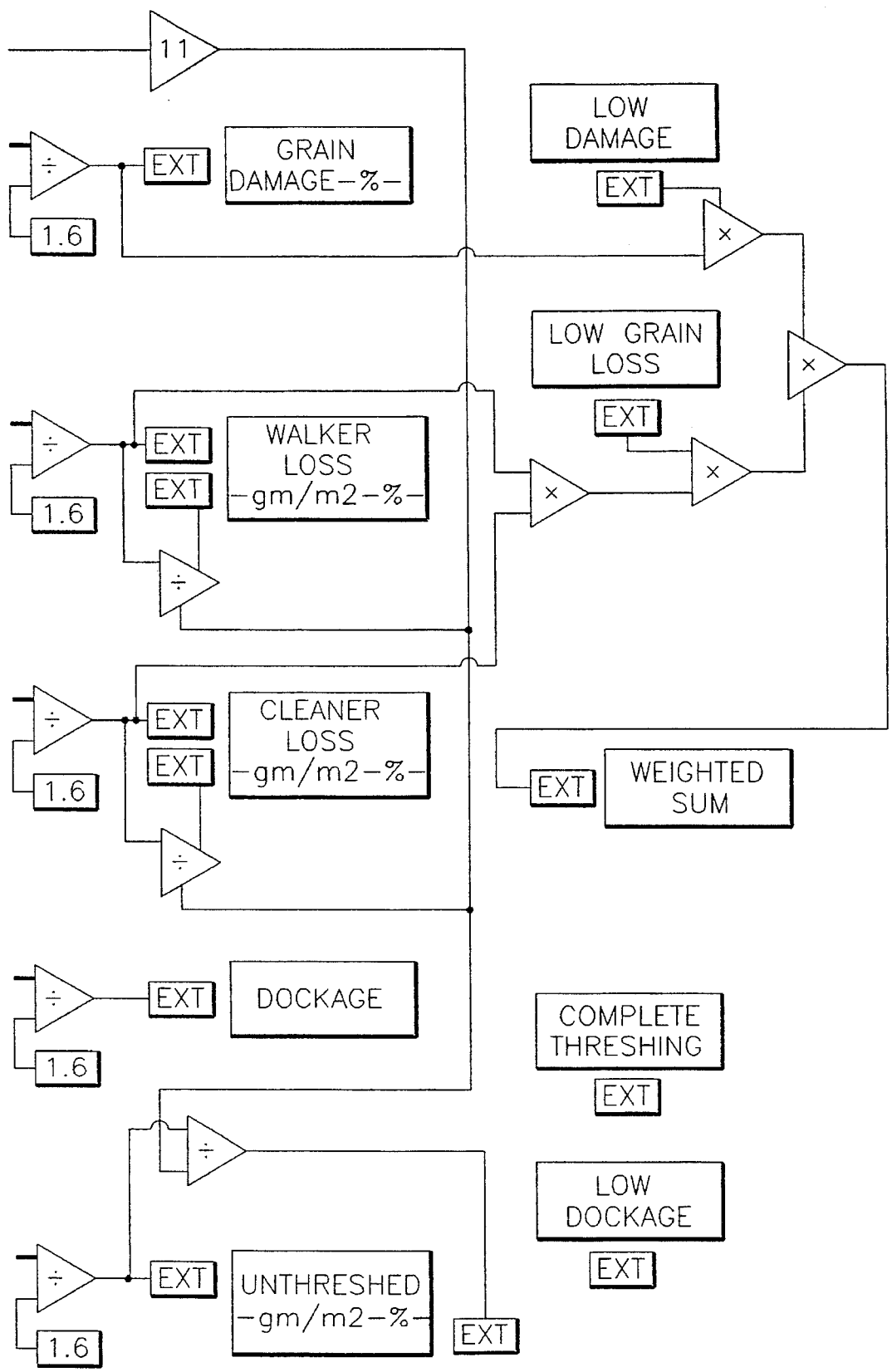
Figure 5F:
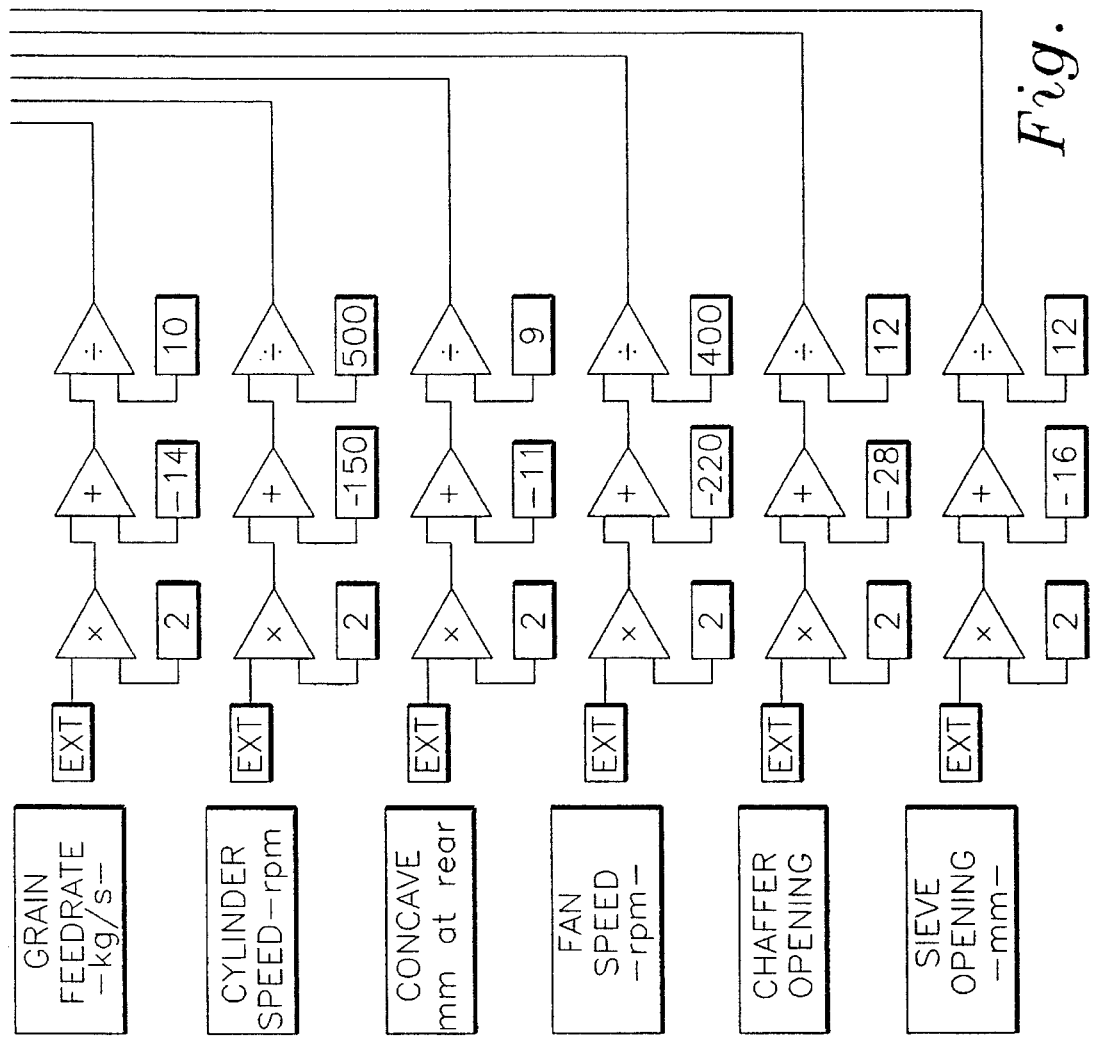

Referring now to FIGS. 4a–4c, a graphical user interface (GUI) is implemented by the computer 64, also using the commercially available LabView II computer software. The GUI of FIGS. 4a–4c allows the operator to input data to the neural network emulation and to view the effects of changes of the process adjustments on the process outputs. The GUI 300 of FIG. 4a shows the screen used by the operator to enter the operator inputs on the local crop conditions, and to display sensor inputs. The threshing condition variable allows the operator to set how hard or easy threshing conditions are. The growing condition variable allows the operator to set how wet or dry are the growing or field conditions are. The GUI 310 of FIG. 4b allows the operator to define the relative weighting to be applied to the output parameters during the global optimization. The GUI 320 of FIG. 4c allows the operator to vary the values of the process adjustments and view the effect on each of the individual output parameters, as well as the "weighted sum" global optimization parameter.

Referring now to FIGS. 5a–5f, a neural network 400 is emulated and implemented on the computer 64, also using the commercially available LabView II computer software. This emulated neural network is used by the operator of the combine harvester 10 to optimize the operation of the combine 10.

Neural network 400 includes inputs for 15 input variables which are scaled to values between −1 and +1, then fed into each of five separate neural networks 402–410, one network for each output parameter. How well a combine operates is indicated by performance quality factors such as grain damage, walker loss, cleaner loss, dockage and unthreshed crop. These outputs are displayed on GUI 320.

Network 402 includes a first layer with six neurons dmg17–dmg22, a second layer with three neurons dmg23–dmg25 and a third or output layer with a single output neuron dmg26. Network 404 includes a first layer with six neurons sep17–sep22, a second layer with three neurons sep23–sep25 and a third or output layer with a single output neuron sep26. Network 406 includes a first layer with six neurons loss17–loss22, a second layer with three neurons loss23–loss25 and a third or output layer with a single output neuron loss26. Network 408 includes a first layer with six neurons dock17–dock22, a second layer with three neurons dock23–dock25 and a third or output layer with a single output neuron dock26. Network 410 includes a first layer with six neurons thr17–thr22, a second layer with three neurons thr23–thr25 and a third or output layer with a single output neuron thr26.

Figure 6:
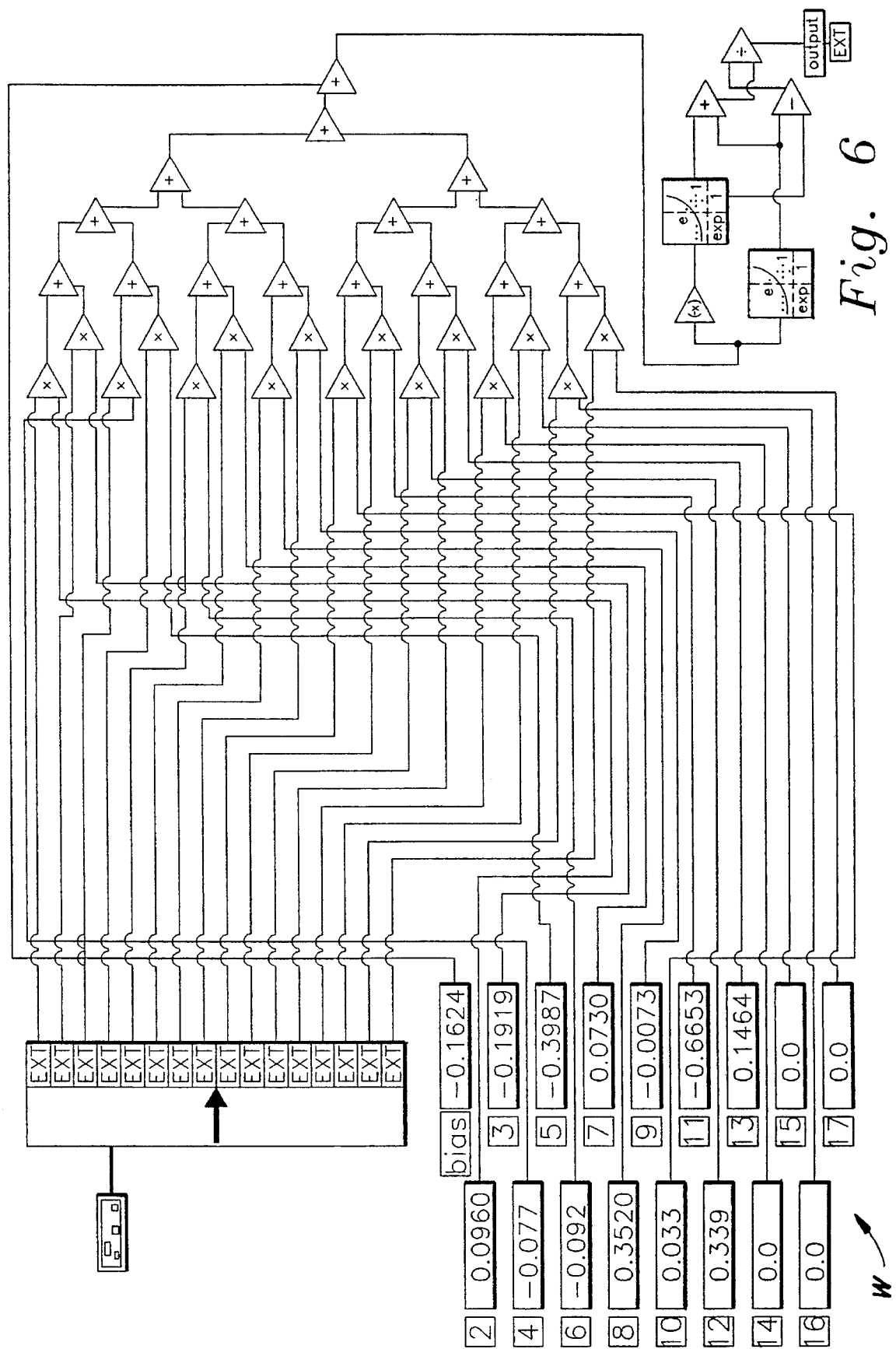
FIG. 6 illustrates a neuron which is representative of the neurons which are in the first layer of the neural network of FIGS. 5b–5f.

FIG. 6 is representative of the first layer neurons. Each first layer neuron includes 15 inputs EXT, a set of weights W associated with the various inputs and arithmetic means for determining an output signal as a function of the inputs and the weights.

Figure 7:
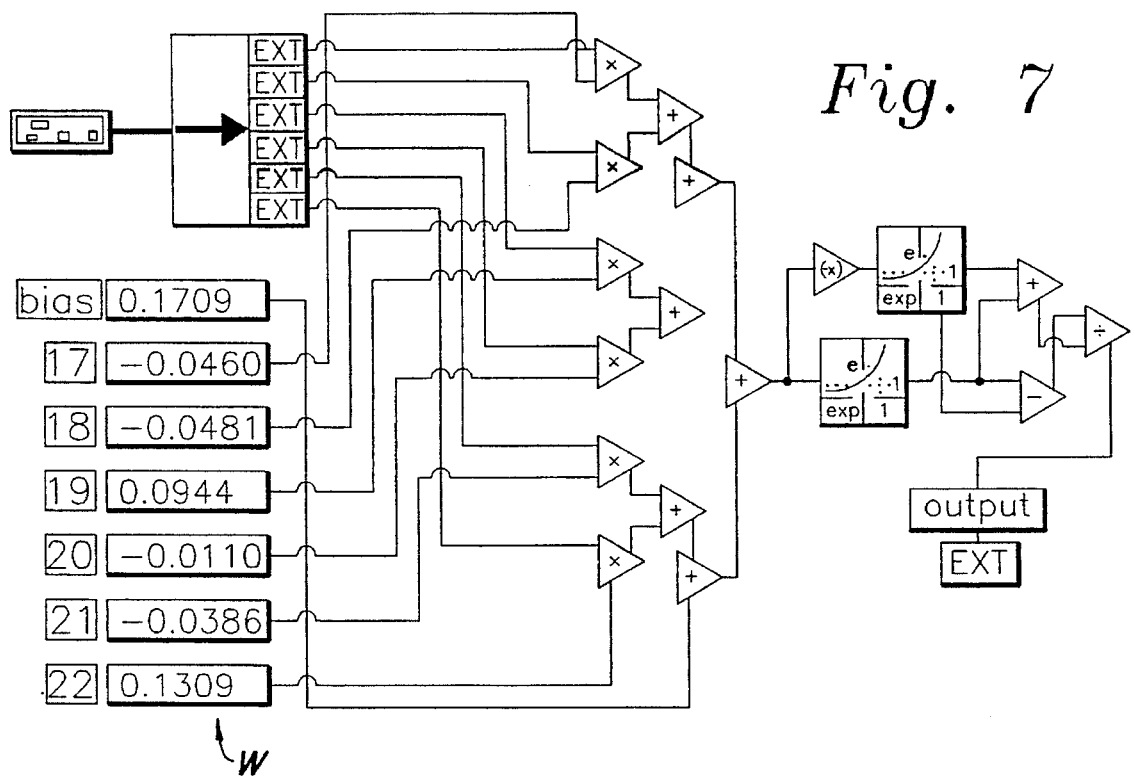
FIG. 7 illustrates a neuron which is representative of the neurons which are in the second layer of the neural network of FIGS. 5b–5f.

FIG. 7 is representative of the second layer neurons. Each second layer neuron includes 6 inputs EXT, a set of weights W associated with the various inputs and arithmetic means for determining an output signal as a function of the inputs and the weights.

Figure 8:
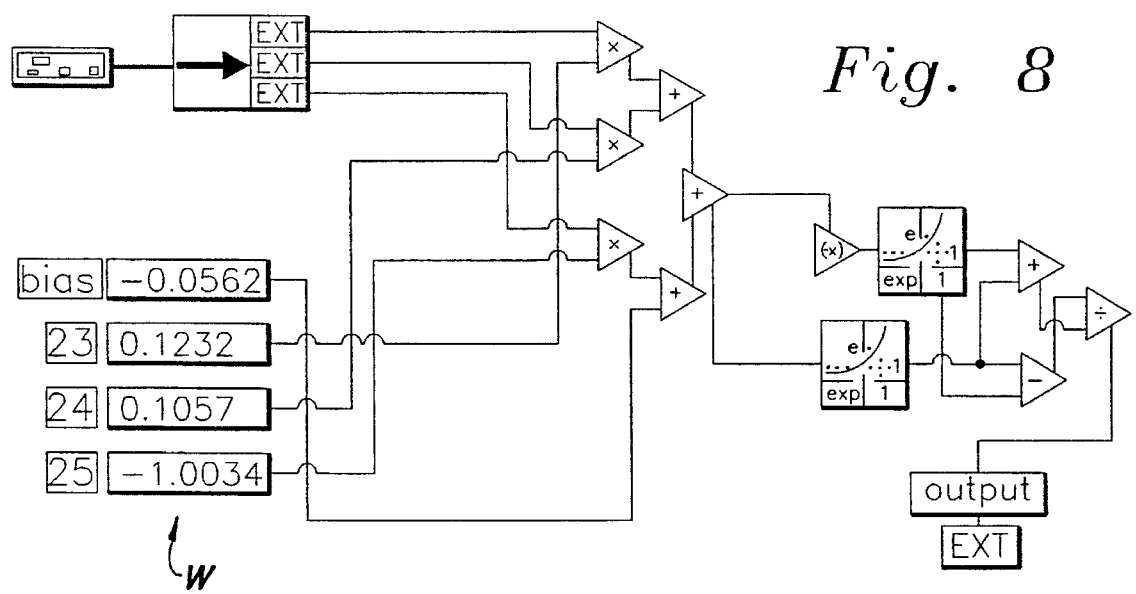
FIG. 8 illustrates a neuron which is representative of the neurons which are in the third or output layer of the neural network of FIGS. 5b–5f.
Figure 9B:
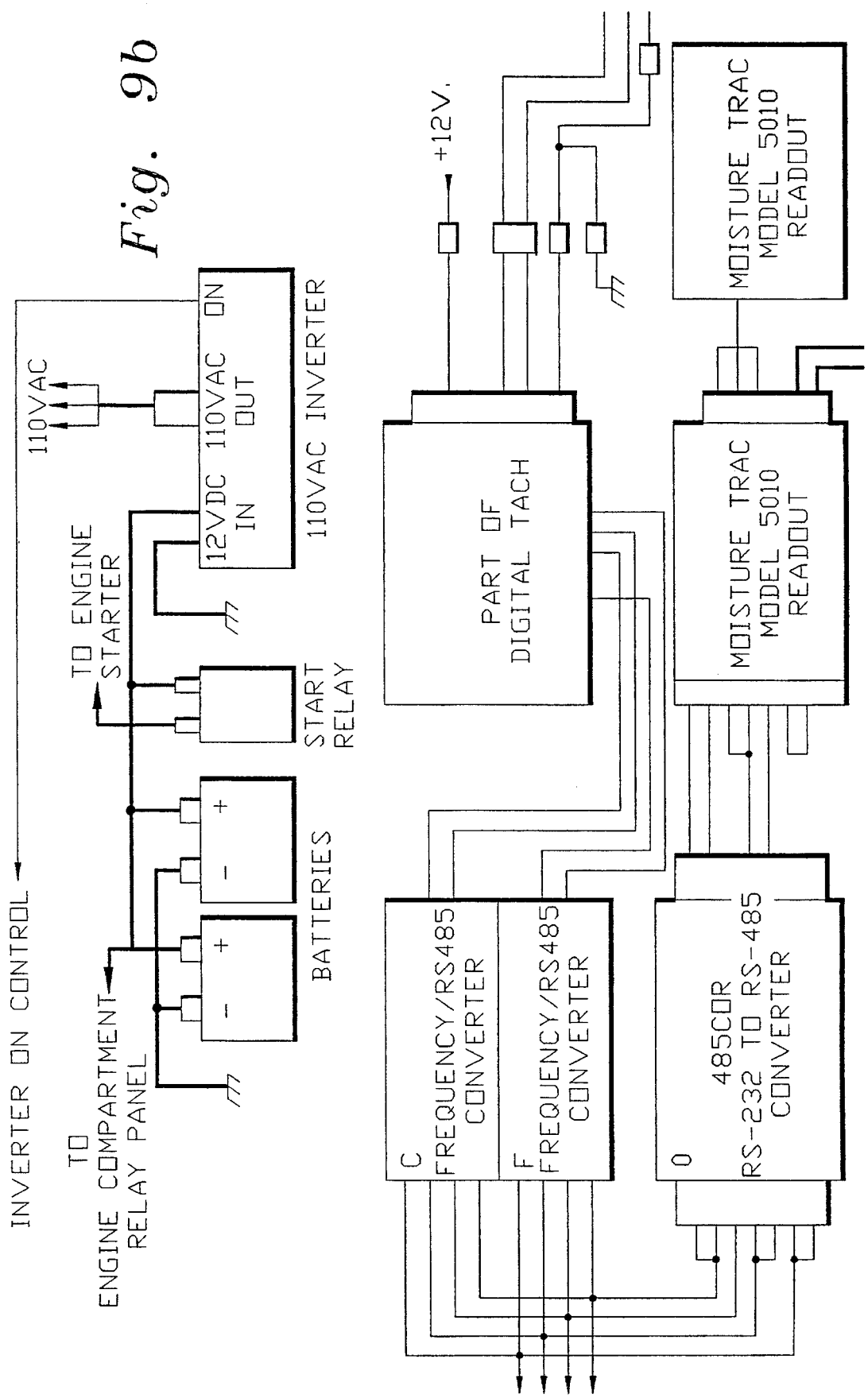
FIGS. 9b–9l are combined to form a wiring diagram illustrating the sensors, relays and actuators of the present invention.
Figure 9C:
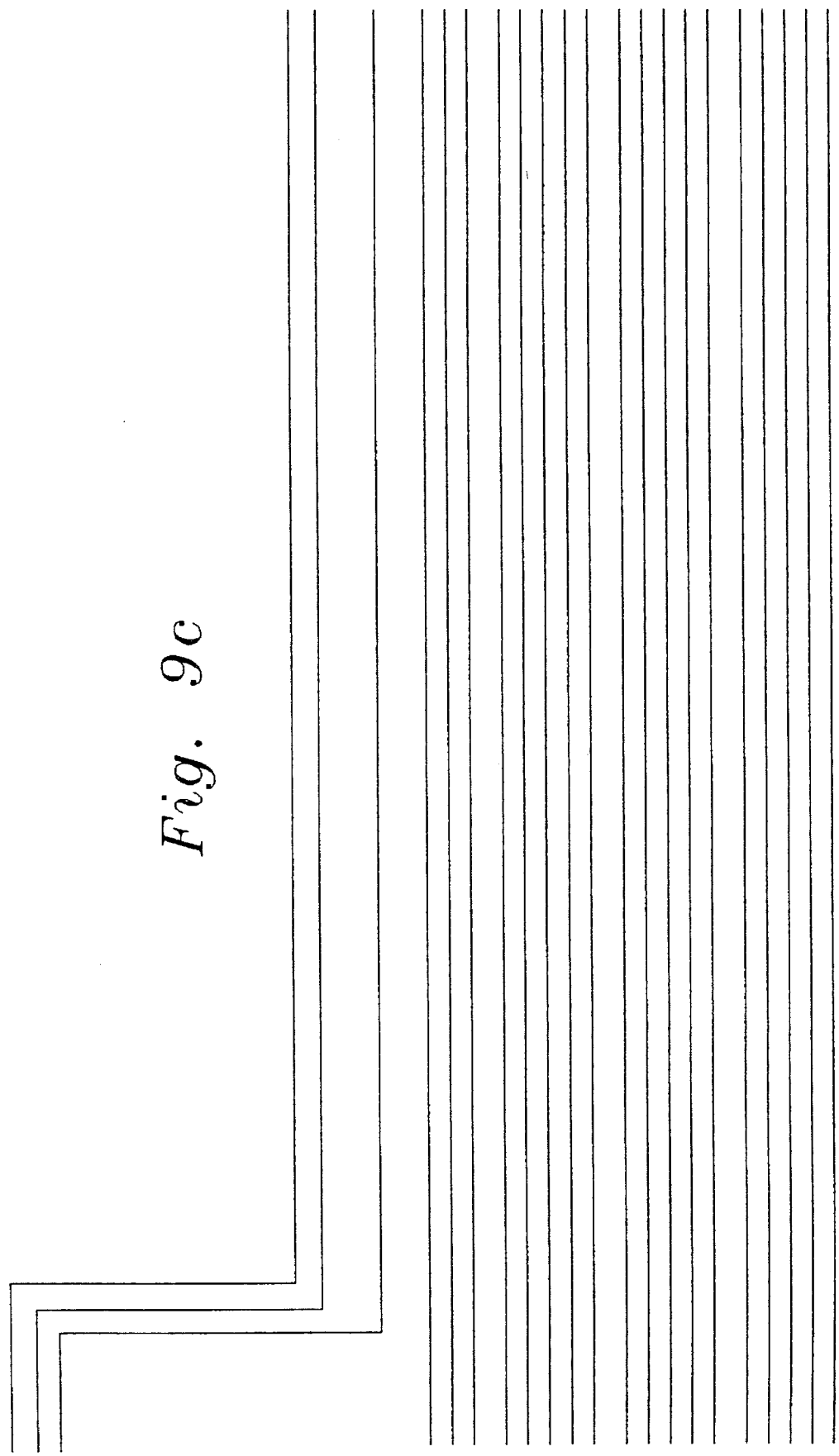
Figure 9D:
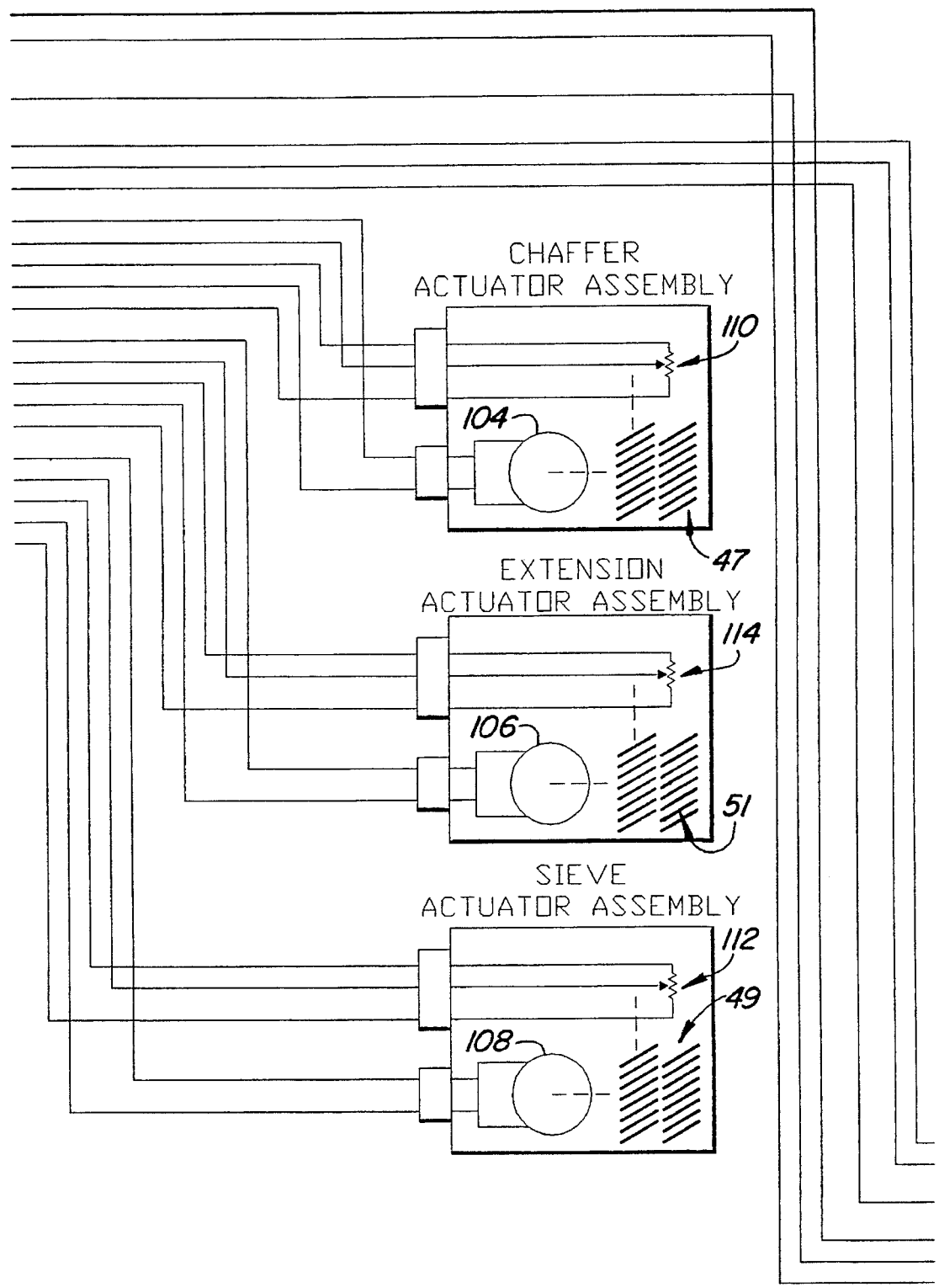
Figure 9E:
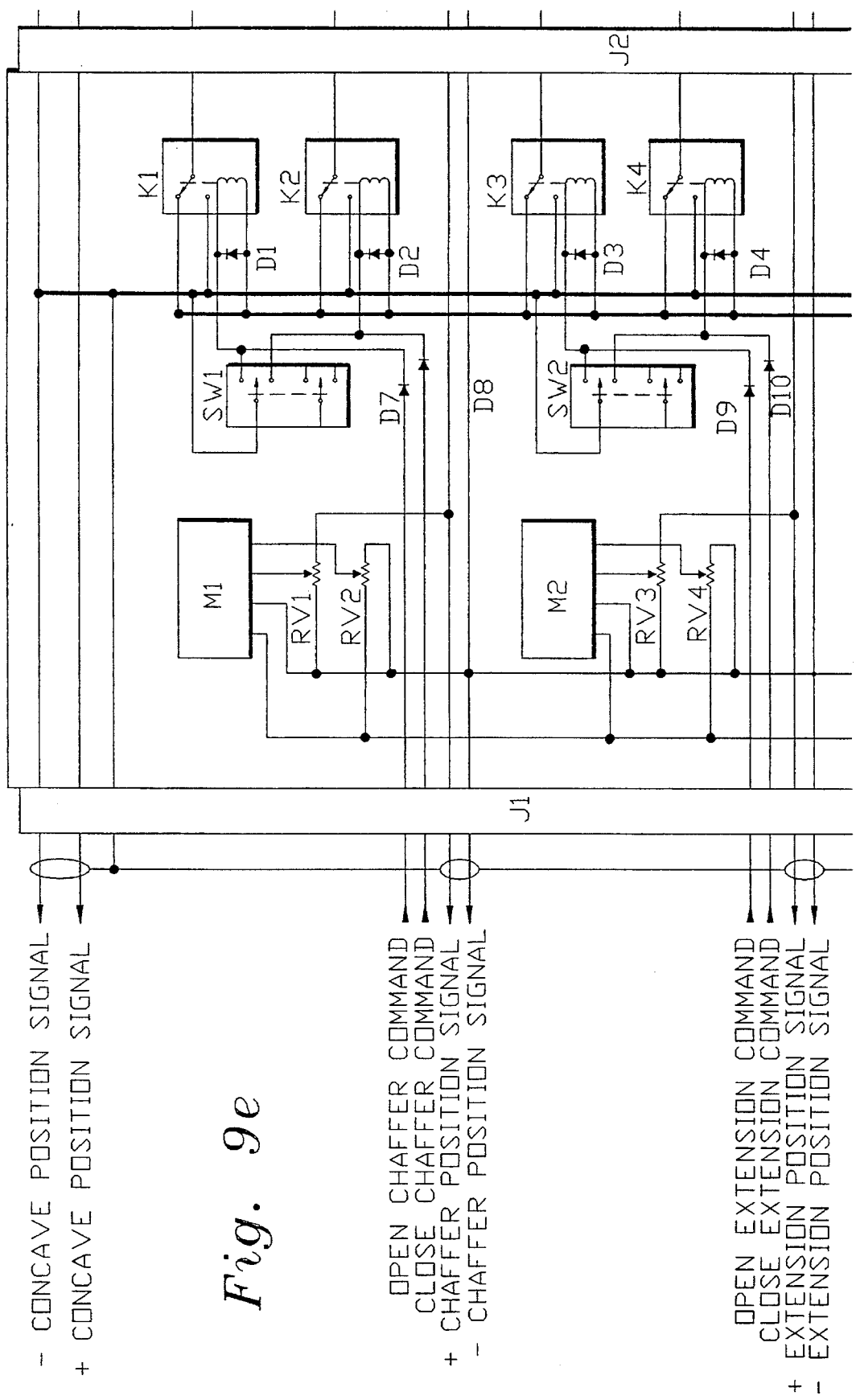
Figure 9F:
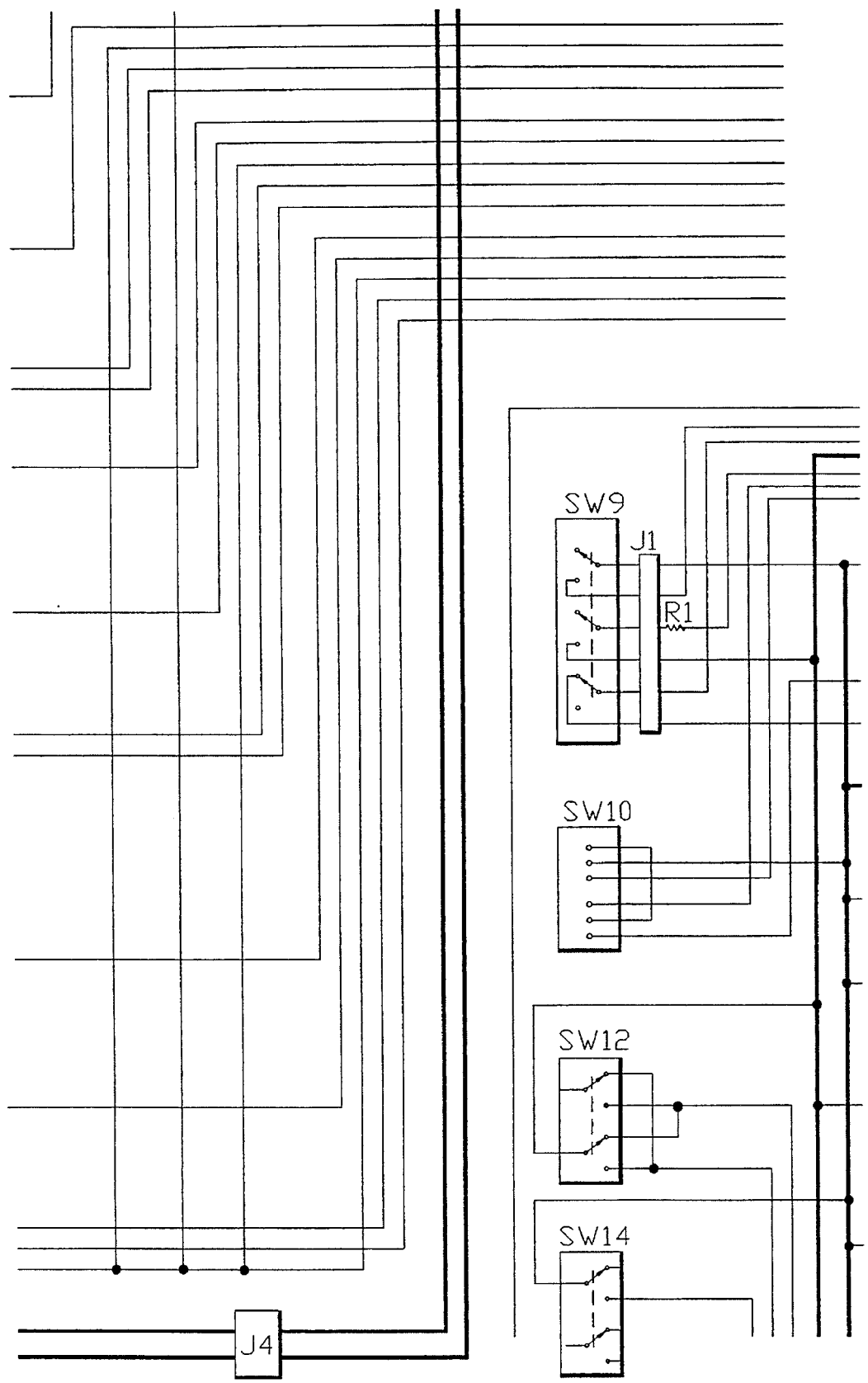
Figure 9G:
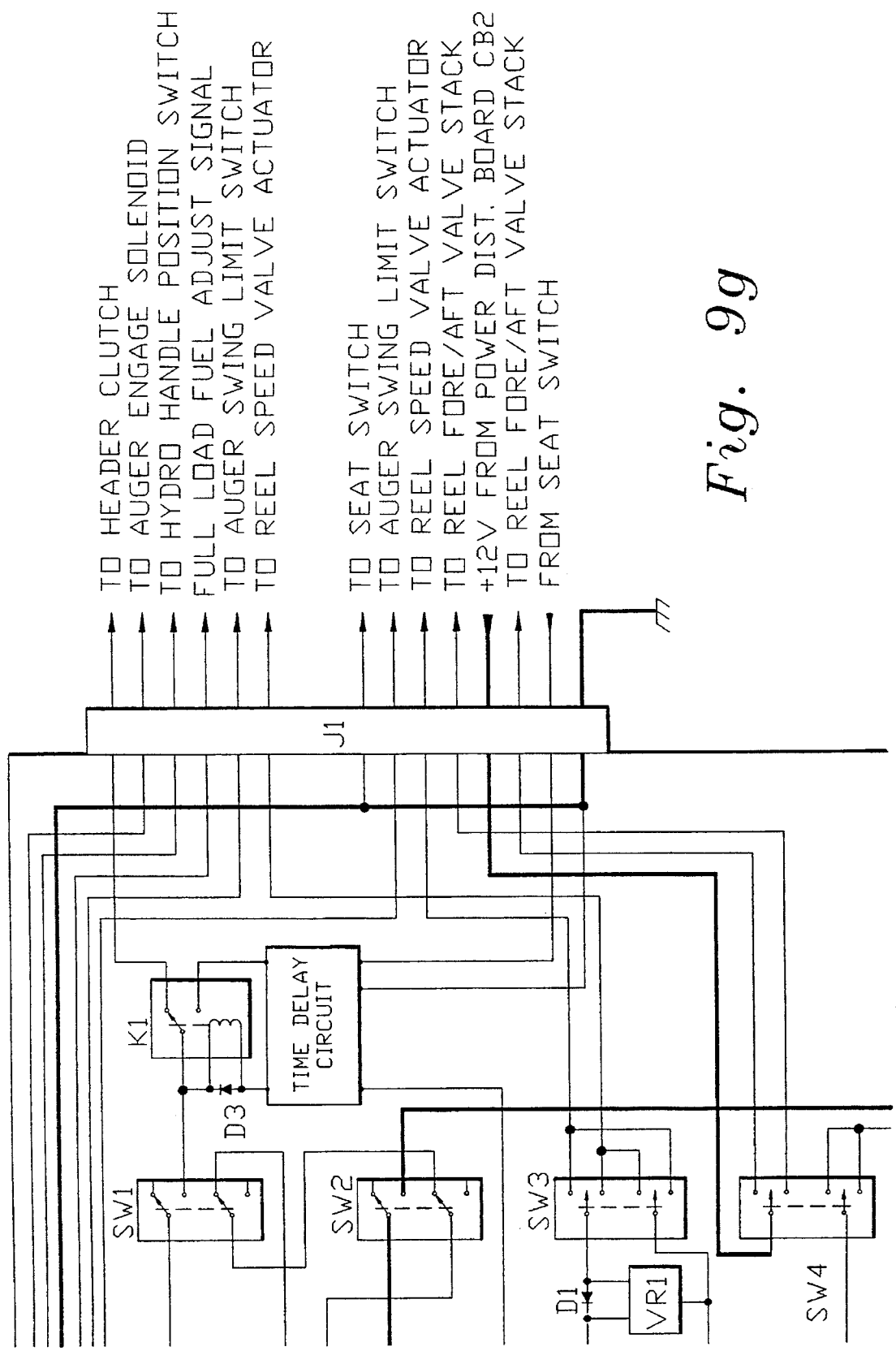
Figure 9H:
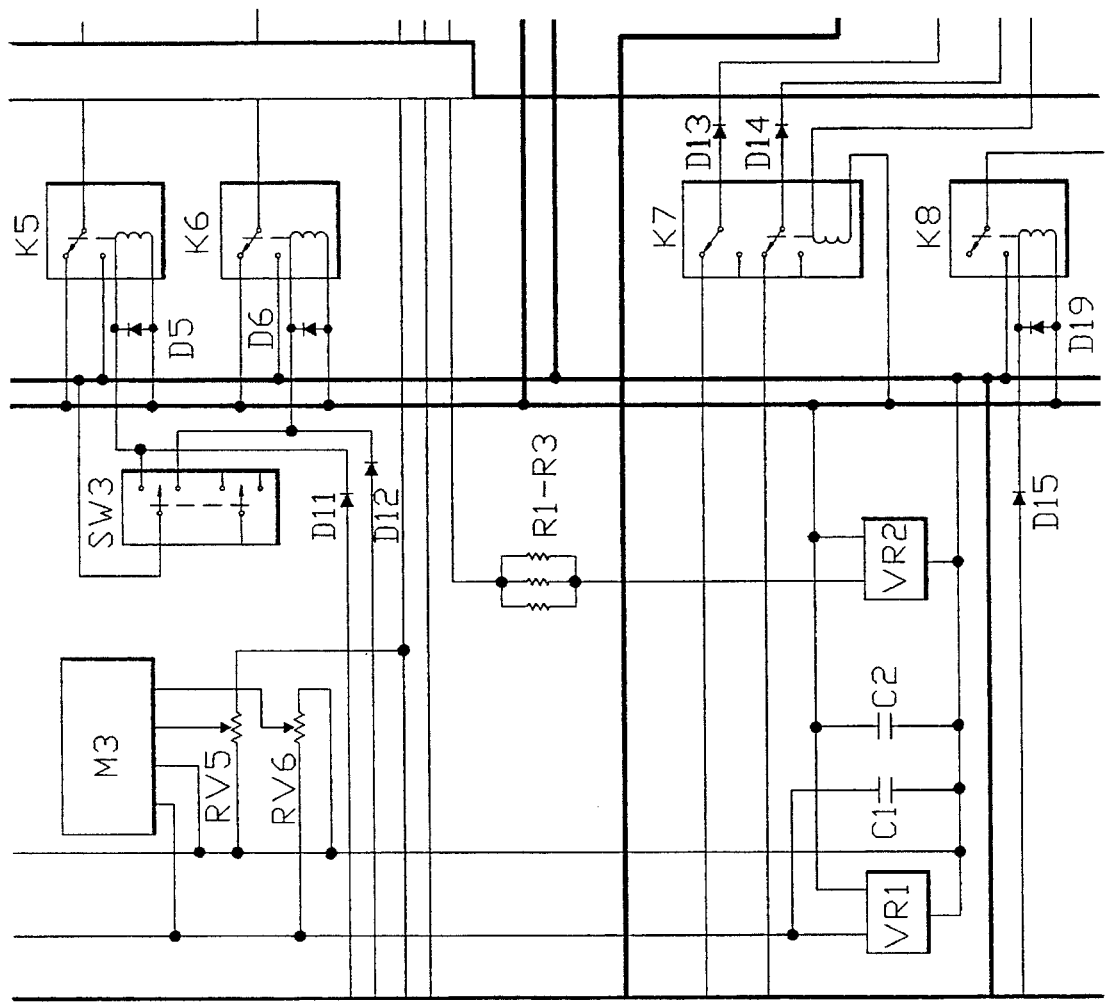
Figure 9I:
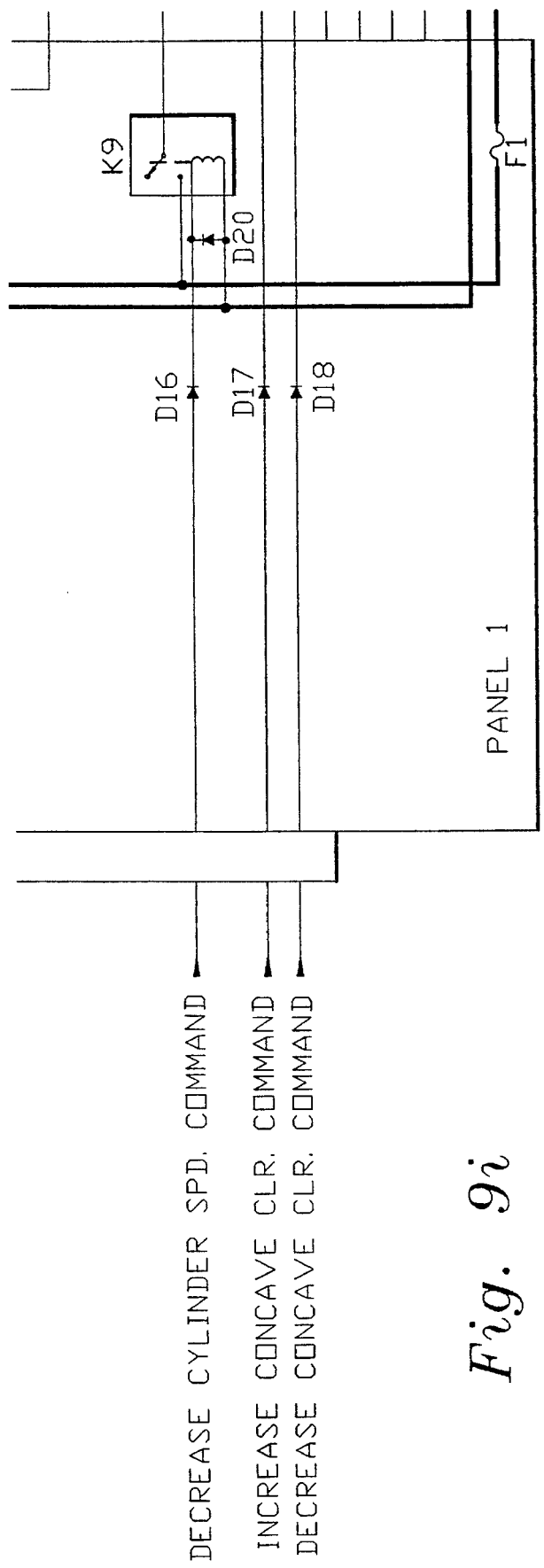
Figure 9J:
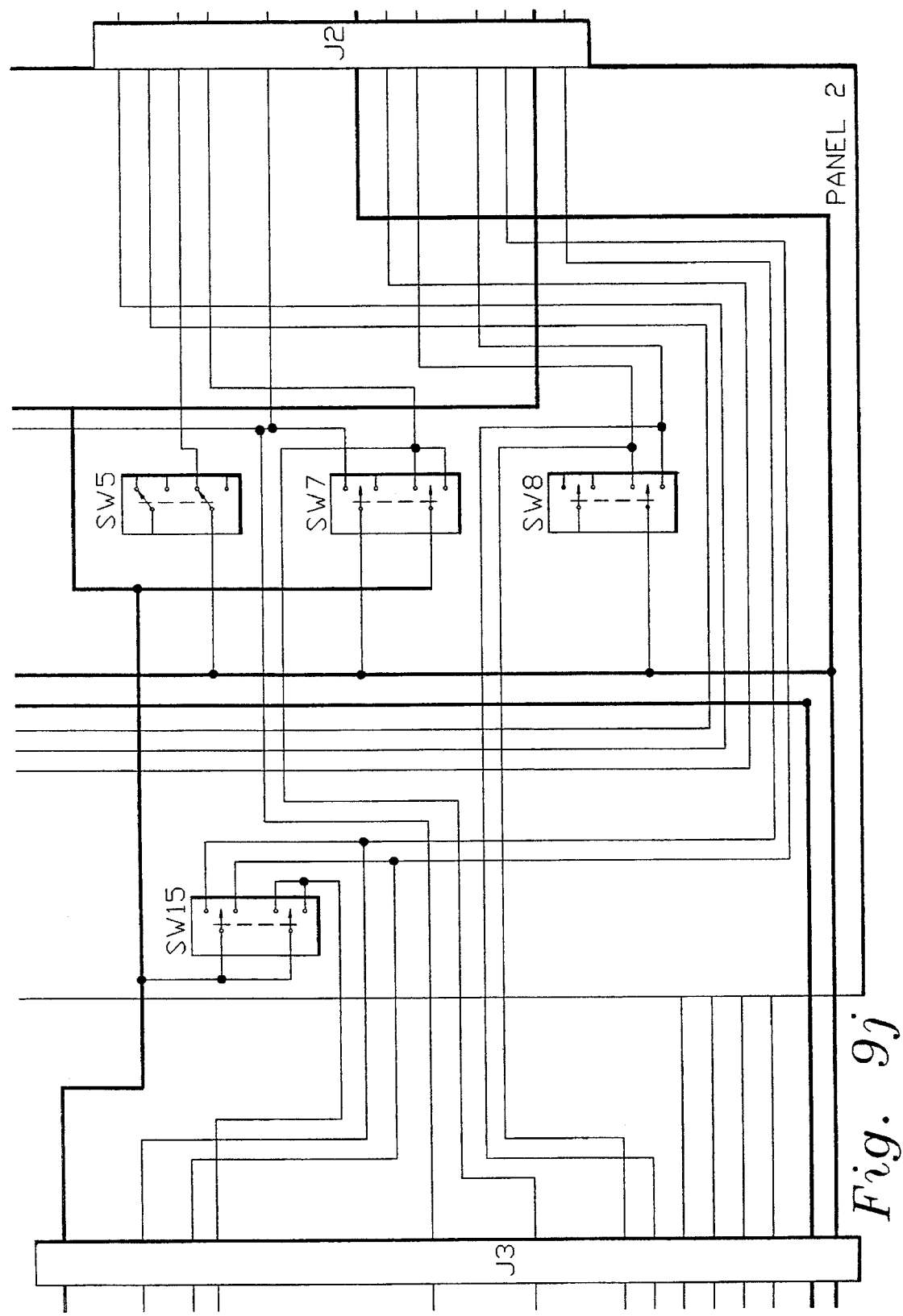
Figure 9K:
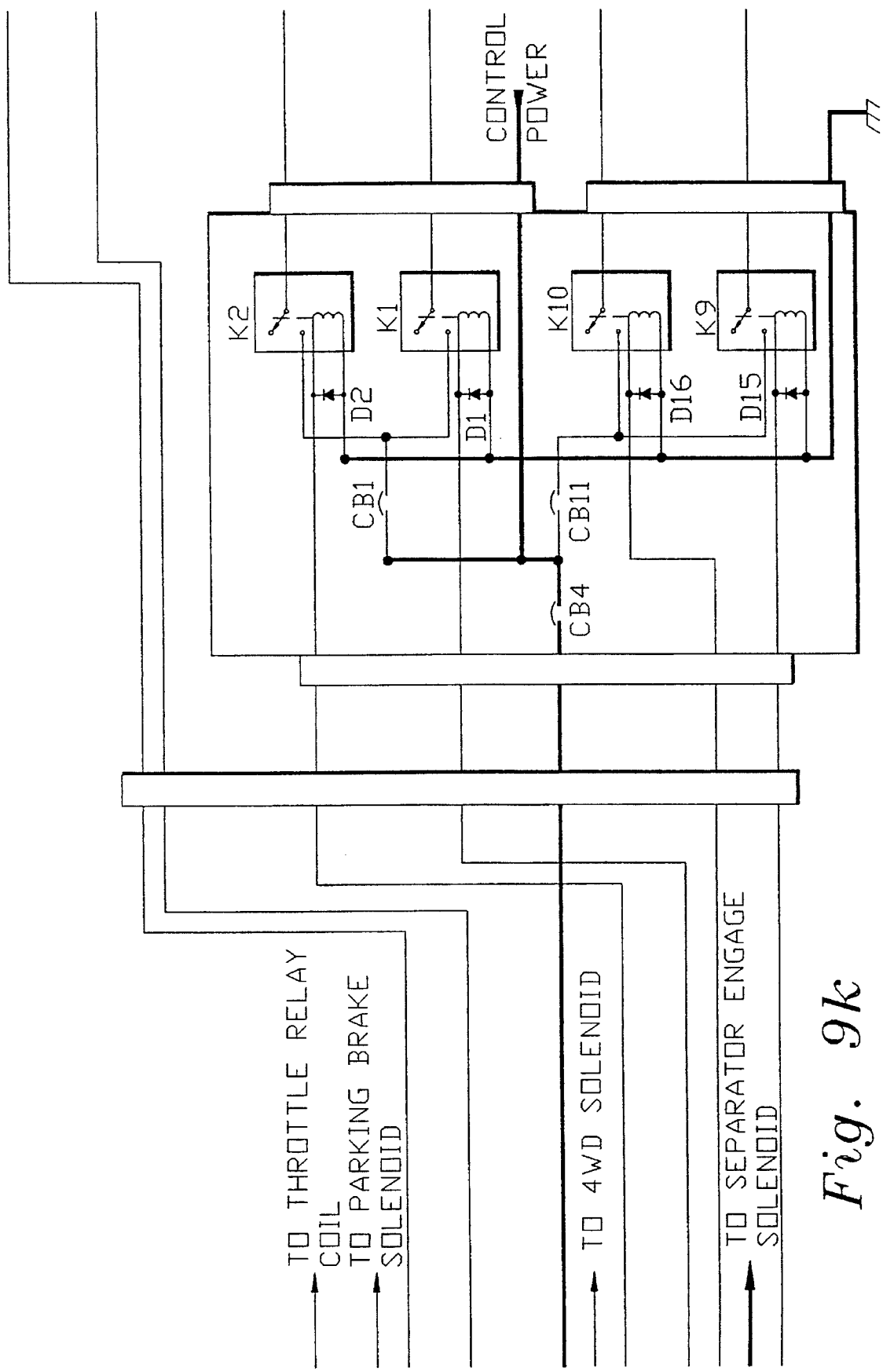
Figure 9L:
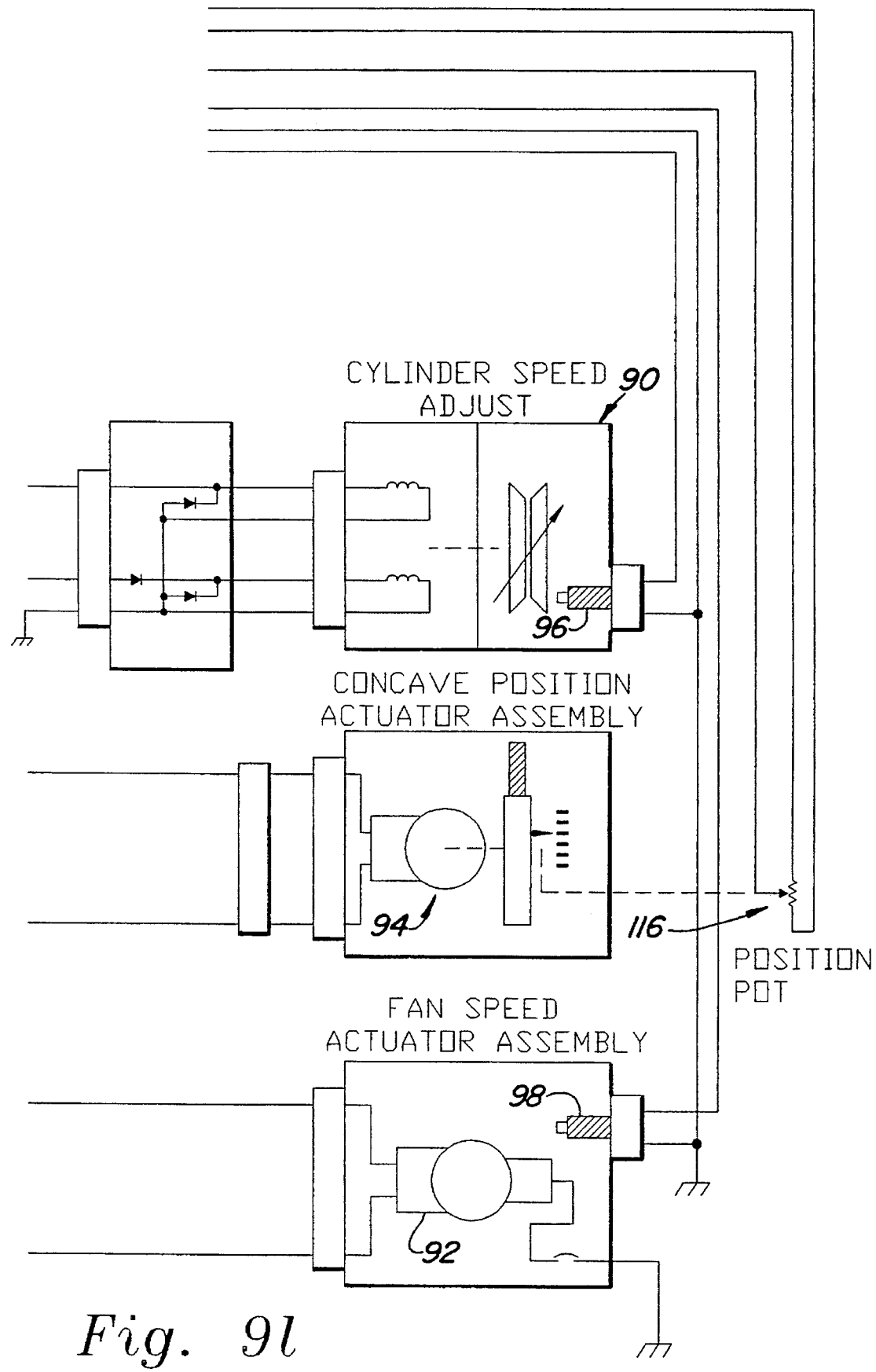

FIG. 8 is representative of the third or output layer neurons. Each third or output layer neuron includes 3 inputs EXT, a set of weights W associated with the various inputs and arithmetic means for determining an output signal as a function of the inputs and the weights.

Each individual neuron within the network is similar to the classic representation of a neuron, with the inputs being multiplied by a weight, summed together, and the sum passed through a squashing function, in this case a hyperbolic tangent. For complete details relating to the neural network 400, and all the neurons and weights therein reference is made to the appropriate portions of the graphical computer program listing included in the microfiche appendix.

The neural network 400 is the result of a multiple part training process described below and it functions as an accurate model of the operation of the combine 10. This model can be exercised to determine the optimum setting of the combine controls. To save time during the training process, the network may be trained off-line on a small workstation computer (not shown), then the connection weights of the trained network were transferred to the emulation program running on the laptop computer 64.

A neural network with the architecture of neural network 400 is first trained to function as a general model of the operation of the combine 10. The training data consists of many examples specifying the process inputs and the corresponding outputs. These examples are selected as representative of normal combine operation, and are characterized by setting the inputs for local condition A and local condition B equal to zero. The network is then trained with this general training data using a conventional back-propagation training algorithm.

Next the training data is supplemented with an additional set of examples representing some specific local condition. To distinguish the local data from the general data, examples from a given local condition are given a unique coding using the local condition inputs. For example, all data from one specific local condition might have the coding local condition A=1 and local condition B=0. The neural network is then retrained on this combined data set using the same back-propagation training algorithm. The network can be trained to represent multiple local conditions by adding additional local data sets to the set of training examples, each with a unique coding.

The result is that the trained neural network functions as a general combine model when the inputs for the local conditions inputs are both set equal to zero, and functions as a model of some specific local condition when the local condition inputs match the encoding of some local data set contained within the training data.

By limiting the number of connections within the neural network, it is possible to control the degree of independence between the local models and the general model. With fewer connections, the models tend to have a degree of dependence. In cases where there is a large amount of data available for the general model, and only limited data for a local model, this property provides a method for knowledge inheritance from the general model to the local model. The limited degrees of freedom within the neural network are used to model the relationships in which the data indicates explicit differences between the general and the local model. For areas of the local model in which no explicit relationship is given by the data, the limited degrees of freedom force the local model to inherit the relationships contained in the general model.

Stated another way, the neural network disclosed herein is trained with a general set of data to function as a general model of a machine or process and is trained with a combined set of data including the general set of data and a local set of data to function as a local model or submodel of the machine or process. The neural network has an architecture in which the degrees of freedom available for forming models are constrained by the limited number of nodes in the hidden layers. The result is that this neural network is able to accurately function as a general model of the machine or process, but it has insufficient degrees of freedom for the submodels to function completely independent of the general model. Instead, the functioning of the submodels is partially dependent upon the functioning as the general model, and the submodels will deviate from the general model with respect to local training data which differs from the general training data, but will have properties similar to the general model where the local training data does not contradict the general training data.

The general model may be trained from data taken from a variety of sources, including test data on combines operating under typical conditions and numerical representations of expert heuristics. The submodel training is done by operating the combine under specific local conditions and making several local measurements of the combine in operation, noting both the input and output parameters. Typically four to eight measurements for each distinct local condition are sufficient. Replicate sets of these local examples are added to the set of general training cases so that the number of new examples represents at least 10–20% of the total training cases.

As described earlier, the local condition inputs are used as indicators to inform the network whether a given data set represents a general condition or a specific local condition. This local condition input is set to zero for general model training and operation, and is set to some non-zero value for a given local condition. Several different local conditions might be keyed to various values of this local condition input. When the network, that had been previously trained with the general data set, is given further training on the enhanced or combined data set, it forms numerically accurate submodels of the local harvesting processes represented by the local data. These local process models incorporate the specific relationships and numerical values that were contained in the local data, and inherit characteristics from the general model which were not explicitly contained in the local data. This ability allows the network to mimic human-like decision making and generalization. This capability also produces a process model which can be easily and locally adapted to satisfy specific local needs.

With such a numerically accurate submodel of the harvesting process, it is possible to quickly and easily predict the effect of various combine adjustments on combine performance. This is far superior to the current practice of making a change in adjustment, stopping the machine and dismounting, observing the effect, making an additional change, and so on. When implemented on a portable computer, this process model could provide the basis for manually optimizing the harvesting process.

For example, an operator can manually and systematically adjust the six operator controls via GUI 200 of FIG. 3 to optimize the outputs (minimize the weighted sum on GUI 320 of FIG. 4c) of the combine as determined by the relative importance or weight of the combine outputs set via GUI 310 of FIG. 4b. This can be done utilizing a repetitive, "one-variable-at-a-time" technique, or by utilizing a well known optimization technique such as gradient descent optimization.

A numerically accurate, neural network based process model can also form the basis of an automatic combine adjustment controller. Several techniques are well known in the art for integrating a model into a process optimization routine. One example would be to perform a gradient search optimization using the model to predict the effect of each change in adjustments. Such optimization techniques could be easily automated by the addition of computer software optimization algorithm.

The accuracy of the overall optimization/control strategy could be enhanced by the addition of feedback sensors for some of the process outputs. This technique would lessen the level of accuracy required by the local model, and would perhaps permit the process optimization to be performed from the general model itself without local calibration.

In the case of a combine harvester, there are five process outputs to be optimized, but sensors are available for only one of these outputs. If accurate sensors were available for all outputs, optimization of the harvester adjustments could be done with traditional control techniques. Since feedback data on the outputs are not available, knowledge processing techniques are being used to form an accurate process model. An accurate model can then provide accurate estimates of the process outputs, which are used for open-loop optimization of the process.

In addition to its applicability for combine harvester process control, the general techniques outlined above have broad application to a variety of process control and optimization problems.

The above also provides:

a technique for controlling and optimizing an entire process simultaneously, rather than attempting to control isolated sub-systems;

a technique to fuse knowledge from a variety of sources into a single model of a general process;

a simple technique for transforming a general model into numerically accurate submodels of a process under specific local conditions. This local model can then be used for process optimization.

The generalization process used in this technique forms models which are similar to those obtained by skilled human operators operating under similar conditions. This provides the possibility of replacing skilled human operators with computer-based controllers for complex process control.

The system is capable of continuous self-improvement. As information becomes available it can be easily incorporated into the model. Over time, the specific knowledge available from human experts, either about the total process or about process subsystems, can be accumulated and integrated into the system.

A portion of the disclosure of this patent document contains material which is subject to a claim of copyright protection. The copyright owner has no objection to the facsimile reproduction by anyone of the patent document or the patent disclosure, as it appears in the Patent and Trademark Office patent file or records, but otherwise reserves all other rights whatsoever.

While the present invention has been described in conjunction with a specific embodiment, it is understood that many alternatives, modifications and variations will be apparent to those skilled in the art in light of the foregoing description. For example, the software/computer-based graphical user interfaces, the data acquisition/actuator controller and the neural network emulator of the present invention could be all be replaced by functionally equivalent hardware systems. Accordingly, this invention is intended to embrace all such alternatives, modifications and variations which fall within the spirit and scope of the appended claims.

I claim:

1. A machine control system for controlling a machine which operates in a variety of locations and conditions and which produces an end result, the control system comprising:

a plurality of actuators, each for controlling a particular function of the machine in response to an actuator control signal;

a plurality of actuator sensors, each generating an actuator condition signal representing a condition of a corresponding one of the actuators;

a plurality of input condition sensors, each generating an input condition sensor signal representing an input condition which influences operation of the machine, an actuator control unit for generating the actuator control signals as a function of the actuator condition signals and as a function of setpoint signals;

a neural network trained prior to and apart from normal production use of the machine with a set of general training data to function as a general model of the machine and trained to function as a submodel with respect to a set of local condition data together with the set of general training data, the neural network processing the input condition sensor signals and data collected prior to normal production use of the machine representing desired machine performance quality to produce a set of machine adjustments intended to produce the desired machine performance quality, the neural network generating the setpoint signals based upon predicted responses of the machine to varying conditions;

a data communication system comprising means for communicating the actuator signals to the actuator control unit, means for communicating the sensor signals to the neural network, and means for communicating the setpoint signals to the actuator control unit, the neural network and the actuator control unit cooperating to control operation of the machine without measuring the machine performance quality in connection with normal production use of the machine; and operator controlled means for selectively causing the neural network to function as the general model or as the submodel.

2. A control system for a combine for operating in a variety of locations and conditions and which harvests a crop, the combine having a variable speed threshing cylinder, a concave having a variable clearance, a variable speed cleaning fan, a sieve, a chaffer, and a cleaner extension, the control system comprising:

a set of actuators, each for controlling a particular function of the combine in response to an actuator control signal;

a set of actuator sensors, each generating an actuator condition signal representing a condition of a corresponding one of the actuators;

a set of input condition sensors, each generating an input condition sensor signal representing an input condition which influences operation of the combine;

an actuator control unit for generating the actuator control signals as a function of the actuator condition signals and as a function of setpoint signals;

a neural network trained prior to and apart from normal production use of the combine with a set of general training data to function as a general model of the combine and trained to function as a submodel with respect to a set of local condition data together with the set of general training data, the neural network processing the input condition sensor signals and data collected prior to normal production use of the combine representing desired crop harvesting performance quality to produce a set of combine adjustments intended to produce the desired crop harvesting performance quality, the neural network generating the setpoint signals based upon predicted responses of the combine to varying conditions;

a data communication system comprising means for communicating the feedback signals to the actuator control unit, means for communicating the sensor signals to the neural network, and means for communicating the setpoint signals to the actuator control unit, the neural network and the actuator control unit cooperating to control operation of the combine without measuring the crop harvesting performance quality produced by the combine; and operator controlled means for selectively causing the neural network to function as the general model or as the submodel.

3. A control system for a combine for operating in a variety of locations and conditions and which harvests a crop, the combine having a plurality of controllable components, the components comprising a variable speed threshing cylinder, a concave having a variable clearance, a variable speed cleaning fan, a sieve, a chaffer and a cleaner extension, the control system comprising:

a set of actuators, each for controlling a corresponding one of the components in response to a corresponding actuator control signal;

a set of actuator sensors, each generating an actuator condition signal representing a condition of a corresponding one of the actuators;

a set of input condition sensors, each generating an input condition sensor signal representing an input condition which influences operation of the combine;

an actuator control unit for generating the actuator control signals as a function of the actuator condition signals and as a function of setpoint signals;

a neural network trained prior to and apart from normal production use of the combine with a set of general training data to function as a general model of the combine and trained to function as a submodel with respect to a set of local condition data together with the set of general training data, the neural network processing the input condition sensor signals and data collected prior to normal production use of the machine representing desired crop harvesting performance quality to produce a set of combine adjustments intended to produce the desired crop harvesting performance quality, the neural network generating the setpoint signals as a function of predicted responses of the combine to varying conditions;

a data communication system comprising means for communicating the actuator signals to the actuator control unit, means for communicating the sensor signals to the neural network, and means for communicating the setpoint signals to the actuator control unit, the neural network and the actuator control unit cooperating to control operation of the combine without measuring the crop harvesting performance quality produced by the combine; and operator controlled means for selectively causing the neural network to function as the general model or as the submodel.

4. The combine control system of claim 3, wherein the set of input condition sensors comprises:

a relative humidity sensor;

a grain moisture sensor; and a grain temperature sensor.

5. The combine control system of claim 3, wherein the combine further comprises a set of combine parameter sensors compring:

a grain feedrate sensor;

a threshing cylinder speed sensor;

a concave clearance sensor;

a cleaning fan speed sensor;

a sieve position sensor;

a chaffer position sensor; and a cleaner extension position sensor.

6. A machine control system for controlling a machine which operates in a variety of locations and conditions and which produces an end result, the control system comprising:

a plurality of actuators, each for controlling a particular function of the machine in response to an actuator control signal;

a plurality of actuator sensors, each generating an actuator condition signal representing a condition of a corresponding one of the actuators;

a plurality of input condition sensors, each generating an input condition sensor signal representing an input condition which influences operation of the machine;

an actuator control unit for generating the actuator control signals as a function of the actuator condition signals and as a function of setpoint signals;

a neural network trained prior to and apart from normal production use of the machine with a set of general training data to function as a general model of the machine and trained to function as a submodel with respect to a set of local condition data together with the set of general training data, the training data being obtained prior to normal production use of the machine and from sources other than the specific machine being controlled and not directly or indirectly from the specific machine being controlled, the neural network generating the setpoint signals based upon predicted responses of the machine to varying conditions;

a data communication system comprising means for communicating the actuator signals to the actuator control unit, means for communicating the sensor signals to the neural network, and means for communicating the setpoint signals to the actuator control unit, the neural network and the actuator control unit cooperating to control operation of the machine; and operator controlled means for selectively causing the neural network to function as the general model or as the submodel.

7. A machine control system for controlling a machine which operates under a variety of conditions and which produces an end result, the control system comprising:

a plurality of actuators, each for controlling a particular function of the machine in response to an actuator control signal;

a plurality of actuator sensors, each generating an actuator condition signal representing a condition of a corresponding one of the actuators;

a plurality of input condition sensors, each generating an input condition sensor signal representing an input condition which influences operation of the machine;

an actuator control unit for generating the actuator control signals as a function of the actuator condition signals and as a function of setpoint signals;

a neural network trained prior to and apart from normal production use of the machine with a set of general training data to function as a general model of the machine and trained to function as a submodel with respect to a set of local condition data together with the set of general training data, the neural network processing the input condition sensor signals and data collected prior to normal production use of the machine representing desired machine performance quality to produce a set of machine adjustments intended to produce the desired machine performance quality, the neural network generating the setpoint signals based upon predicted responses of the machine to varying conditions;

a data communication system comprising means for communicating the actuator signals to the actuator control unit, means for communicating the sensor signals to the neural network, and means for communicating the setpoint signals to the actuator control unit, the neural network and the actuator control unit cooperating to control operation of the machine; and operator controlled means for selectively causing the neural network to function as the general model or as the submodel.

8. A control system for a combine for operating in a variety of locations and conditions and which harvests a crop, the combine having a variable speed threshing cylinder, a concave having a variable clearance, a variable speed cleaning fan, a sieve, a chaffer, and a cleaner extension, the control system comprising:

a set of actuators, each for controlling a particular function of the combine in response to an actuator control signal;

a set of actuator sensors, each generating an actuator condition signal representing a condition of a corresponding one of the actuators;

a set of input condition sensors, each generating an input condition sensor signal representing an input condition which influences operation of the combine;

an actuator control unit for generating the actuator control signals as a function of the actuator condition signals and as a function of setpoint signals;

a neural network trained prior to and apart from normal production use of the combine with a set of general training data to function as a general model of the combine and trained to function as a submodel with respect to a set of local condition data together with the set of general training data, the neural network processing the input condition sensor signals and data collected prior to normal production use of the combine representing desired crop harvesting performance quality to produce a set of combine adjustments intended to produce the desired crop harvesting performance quality, the neural network generating the setpoint signals based upon predicted responses of the combine to varying conditions;

a data communication system comprising means for communicating the feedback signals to the actuator control unit, means for communicating the sensor signals to the neural network, and means for communicating the setpoint signals to the actuator control unit, the neural network and the actuator control unit cooperating to control operation of the combine; and operator controlled means for selectively causing the neural network to function as the general model or as the submodel.

\* \* \* \* \*

UNITED STATES PATENT AND TRADEMARK OFFICE
CERTIFICATE OF CORRECTION

PATENT NO. : 5,586,033
DATED : 17 December 1996
INVENTOR(S) : James William Hall It is certified that error appears in the above-indentified patent and that said Letters Patent is hereby corrected as shown below:

Claim 5, line 3 delete "compring" and insert "comprising"

Signed and Sealed this

Twelfth Day of August, 1997

Attest:

BRUCE LEHMAN

Attesting Officer

Commissioner of Patents and Trademarks